(12) United States Patent
Hanai

(10) Patent No.: US 11,842,100 B2
(45) Date of Patent: Dec. 12, 2023

(54) SERVER SYSTEM, INFORMATION PROCESSING APPARATUS COMMUNICATING WITH SERVER SYSTEM, CONTROL METHOD, AND COMPUTER-READABLE STORAGE MEDIUM

(71) Applicant: CANON KABUSHIKI KAISHA, Tokyo (JP)

(72) Inventor: Hiroaki Hanai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/157,775

(22) Filed: Jan. 25, 2021

(65) Prior Publication Data
US 2021/0240413 A1 Aug. 5, 2021

(30) Foreign Application Priority Data
Jan. 31, 2020 (JP) ................. 2020-015843

(51) Int. Cl.
*G06F 3/13* (2006.01)
*G06F 3/12* (2006.01)
*H04N 1/00* (2006.01)

(52) U.S. Cl.
CPC .......... *G06F 3/1225* (2013.01); *G06F 3/1205* (2013.01); *G06F 3/1232* (2013.01); *G06F 3/1287* (2013.01); *H04N 1/00214* (2013.01)

(58) Field of Classification Search
CPC .... G06F 3/1225; G06F 3/1205; G06F 3/1232; G06F 3/1287; G06F 3/1255; G06F 3/1288; H04N 1/00214
See application file for complete search history.

(56) References Cited

U.S. PATENT DOCUMENTS

| | | | | |
|---|---|---|---|---|
| 2002/0097431 A1* | 7/2002 | Ikegami | ................ | G06F 21/608 |
| | | | | 358/1.15 |
| 2006/0044606 A1* | 3/2006 | Yamamura | ............ | G06F 3/1264 |
| | | | | 358/1.15 |
| 2006/0256358 A1* | 11/2006 | Chapman | .............. | G06F 3/1248 |
| | | | | 358/1.13 |

(Continued)

FOREIGN PATENT DOCUMENTS

| | | |
|---|---|---|
| JP | 2012160009 A | 8/2012 |
| JP | 2013-238924 A | 11/2013 |
| JP | 2018176467 A | 11/2018 |

*Primary Examiner* — Huo Long Chen
(74) *Attorney, Agent, or Firm* — Canon U.S.A., Inc. IP Division

(57) ABSTRACT

A server system, which registers, based on a registration request received from a printing apparatus, information about the printing apparatus and transmits print data received from an information processing apparatus to the registered printing apparatus, includes an acquisition unit configured to acquire, from the information processing apparatus, print settings of print data and information about the printing apparatus, which is set as a transmission destination for print data in the print settings, a determination unit configured to make a determination as to whether the acquired print settings include a print setting which accords with a conflict condition associated with the acquired information, and a transmission unit configured to transmit, to the information processing apparatus, information that is based on a result of the determination.

12 Claims, 17 Drawing Sheets

(56) References Cited

U.S. PATENT DOCUMENTS

| | | | |
|---|---|---|---|
| 2009/0225366 A1* | 9/2009 | Emori | G06F 3/1204 |
| | | | 358/1.15 |
| 2013/0003120 A1* | 1/2013 | Watariuchi | G06F 3/126 |
| | | | 358/1.15 |
| 2015/0381842 A1* | 12/2015 | Mori | G06F 3/1288 |
| | | | 358/1.14 |
| 2019/0361636 A1* | 11/2019 | Ren | G06F 3/1232 |

* cited by examiner

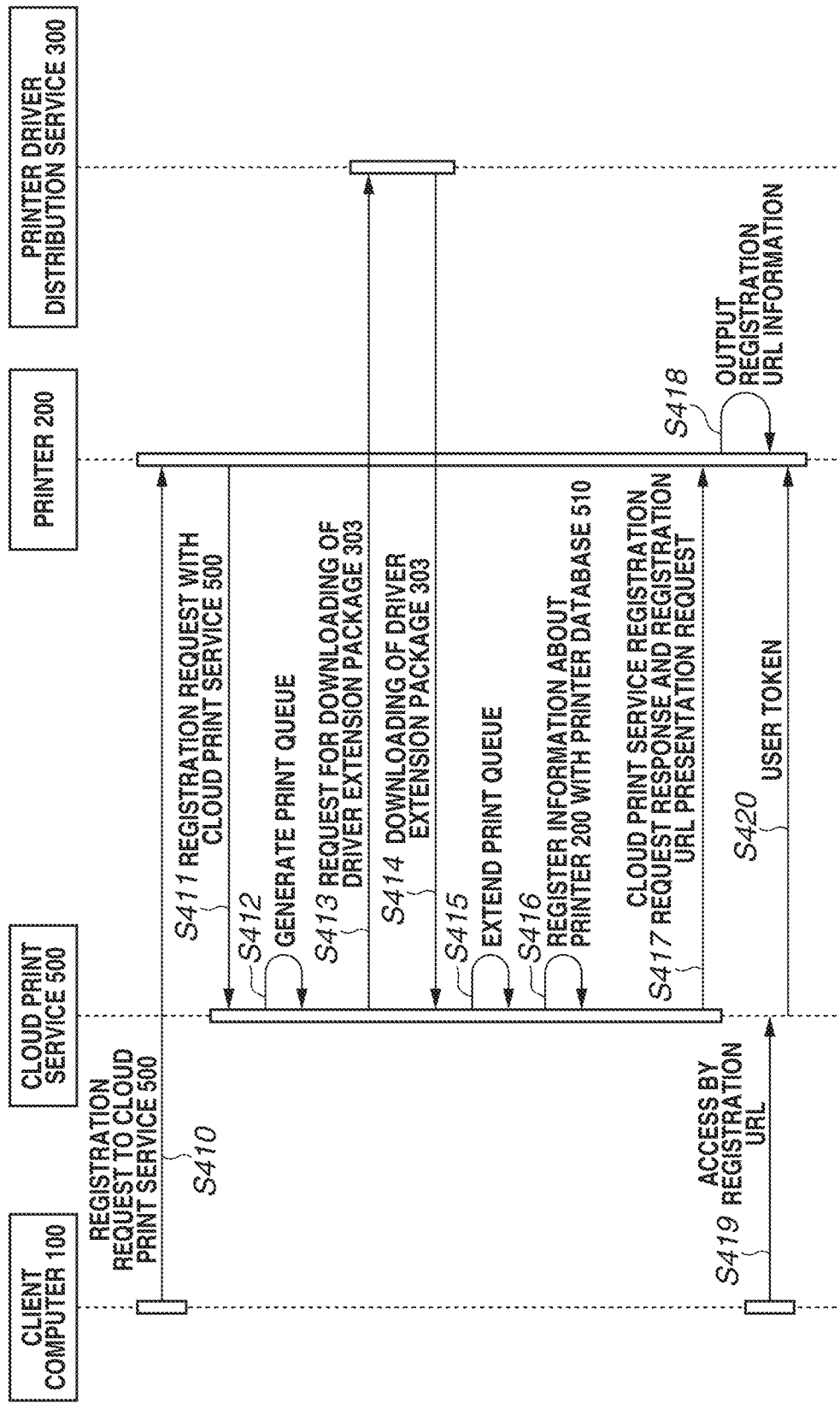

FIG.5A

| DEVICE NAME | HWID | COID | IP ADDRESS | PACKAGE |
|---|---|---|---|---|
| iR-ADV CCCC | iR-ADV_CCCC61B1 | xxyyzz | xxx.xxx.xxx.001 | package C |
| iR-ADV XXXX | iR-ADV_XXXXD80D | xxyyzz | xxx.xxx.xxx.111 | package D |
| AAAA | AAAACF39 | aaabbb | xxx.xxx.xxx.222 | null |
| YYYY | YYYY62B5 | abcabc | xxx.xxx.xxx.234 | null |

FIG.5B

| PACKAGE NAME | HWID | COID | PACKAGE | APPLICATION IDENTIFIER | EXTENSION |
|---|---|---|---|---|---|
| A-Driver | iR-ADV_CCCC61B1 | xxyyzz | package A | | FALSE |
| B-Driver | iR-ADV_XXXXD80D | xxyyzz | package B | | FALSE |
| C-Driver | AAAACF39 | xxyyzz | package C | AAAAA_AA | TRUE |
| D-Driver | YYYY62B5 | xxyyzz | package D | BBBBB_BB | TRUE |

FIG.5C

| APPLICATION NAME | APPLICATION IDENTIFIER | APPLICATION PACKAGE |
|---|---|---|
| A-company App | AAAAA_AA | package AA |
| B-company App | BBBBB_BB | package BB |
| C-company App | CCCCC_CC | package CC |
| D-company App | DDDDD_DD | pakcage DD |

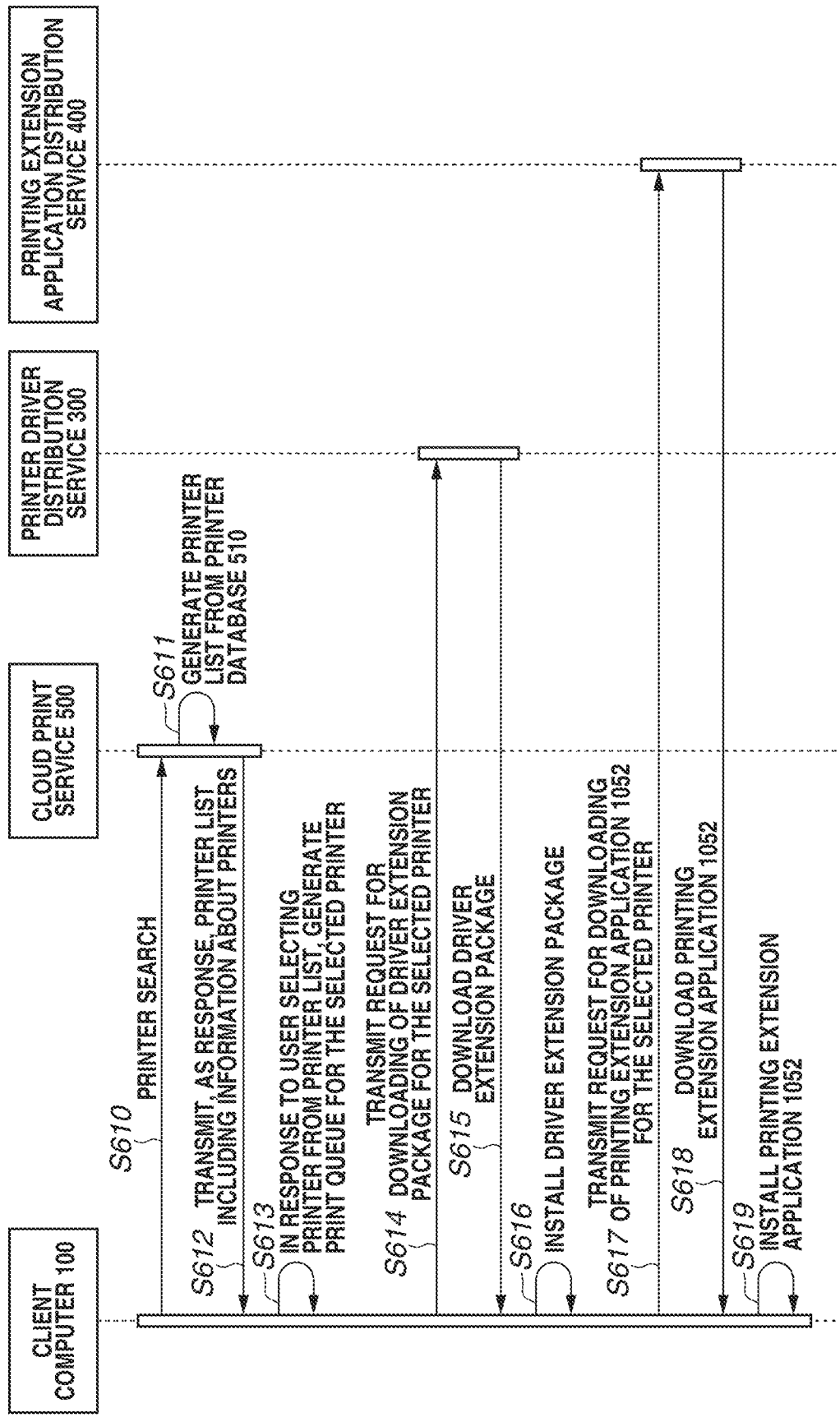

FIG.7

CLOUD PRINT SERVICE

Taro Yamada

| NUMBER OF DOCUMENTS |
|---|
| 5 |

UPDATE

| DOCUMENT NAME | COLOR MODE | DUPLEX | N-UP | NUMBER OF COPIES | DAY/TIME |
|---|---|---|---|---|---|
| ■ aaa.doc | COLOR | ONE-SIDED | 1 in 1 | 1 COPY | 01/14 10:19 |
| ☐ ddd.doc | MONOCHROME | ONE-SIDED | 1 in 1 | 5 COPIES | 01/14 10:19 |
| ☐ eee.pdf | MONOCHROME | DUPLEX | 1 in 1 | 1 COPY | 01/14 10:19 |
| ☐ hhh.doc | COLOR | ONE-SIDED | 1 in 1 | 1 COPY | 01/14 10:20 |
| ☐ jjj.pdf | MONOCHROME | ONE-SIDED | 1 in 1 | 1 COPY | 01/14 10:20 |

1/1 ◁ ▷   ◁◁ ▷▷

SELECT ALL | CANCEL SELECTION | DELETE | 701〜 PRINT | LOGOUT

FIG.9

```
{
    "Duplex": ["Dupex", "One-Sided"],
901  "Color": ["Mono", "Color"],
    "Orientation": ["Portrait", "Landscape"],
    ...
    ...
902  "Extension_Setting1": ["Extension_option1", "Extension_option2"],
    "Extension_Setting2": ["Extension_option1", "Extension_option2"],
}
```

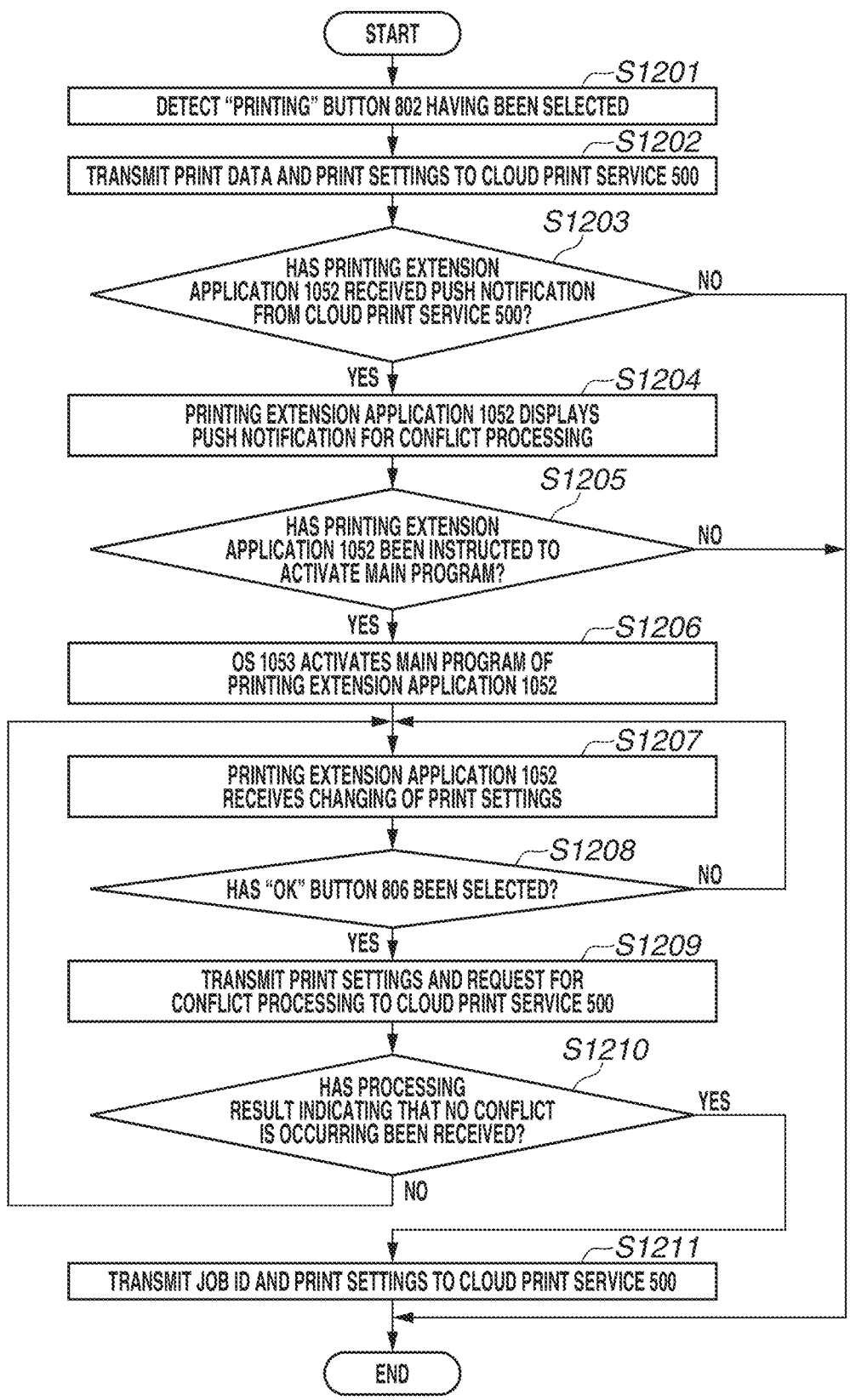

FIG.13

| A | B | C | D | E | F | G | H | I | J | K | L | M | N | O | P | Q | R | S |
|---|---|---|---|---|---|---|---|---|---|---|---|---|---|---|---|---|---|---|
| | | | PAPER TYPE | | | PAPER SIZE | | | STAPLE | | | | DUPLEX | RESOLUTION | | | COPY-FORGERY-INHIBITED-PATTERN PRINTING | STAMP |
| MANAGEMENT NUMBER | NUMBER OF CONFLICT ITEMS (UNITS OF CONDITION) | DESCRIPTION OF RULE | PLAIN TYPE | HEAVY PAPER | OHP | A3 | A4 | A5 | UPPER LEFT | LOWER LEFT | LOWER RIGHT | UPPER RIGHT | | LOW | MEDIUM | HIGH | | |
| 1 | 2 | OHP paper is unavailable for duplex printing. | F | F | T | F | F | F | F | F | F | F | T | F | F | F | F | F |
| 2 | 2 | OHP paper is unavailable for A5 size printing. | F | F | T | F | F | T | F | F | F | F | F | F | F | F | F | F |
| 3 | 2 | A5 size is unavailable for upper left staple. | F | F | F | F | F | T | T | F | F | F | F | F | F | F | F | F |
| 4 | 2 | A5 size is unavailable for lower left staple. | F | F | F | F | F | T | F | T | F | F | F | F | F | F | F | F |
| 5 | 2 | A5 size is unavailable for lower right staple. | F | F | F | F | F | T | F | F | T | F | F | F | F | F | F | F |
| 6 | 2 | A5 size is unavailable for upper right staple. | F | F | F | F | F | T | F | F | F | T | F | F | F | F | F | F |
| 7 | 2 | High resolution is unavailable for copy-forgery-inhibited-pattern printing. | F | F | F | F | F | F | F | F | F | F | F | F | F | T | T | F |
| 8 | 2 | High resolution is unavailable for stamp printing. | F | F | F | F | F | F | F | F | F | F | F | F | F | T | F | T |

SERVER SYSTEM, INFORMATION PROCESSING APPARATUS COMMUNICATING WITH SERVER SYSTEM, CONTROL METHOD, AND COMPUTER-READABLE STORAGE MEDIUM

BACKGROUND

Field of the Disclosure

Aspects of the present disclosure generally relate to a server system, an information processing apparatus communicating with a server system, a control method, and a computer-readable storage medium.

Description of the Related Art

There is known a printing system in which the user is allowed to previously register information about a printing apparatus with a cloud print service and then transmit print data to the printing apparatus via the cloud print service to perform printing. The user accesses the cloud print service via an information processing apparatus, such as a personal computer (PC), selects a printing apparatus which is to be used for printing from among printing apparatuses registered with the cloud print service, and instructs the selected printing apparatus to perform printing of print data.

The information processing apparatus generates a print job and inputs the print job to a print queue present on the cloud print service. The printing apparatus accesses the cloud print service, acquires a print job spooled in the print queue generated on the cloud print service, and performs printing for the print job, as discussed in Japanese Patent Application Laid-Open No. 2013-238924.

Typical examples of such a cloud print service include, for example, Google® Cloud Print, Microsoft® Hybrid Cloud Print, and uniFlow® Online.

While each of printer drivers which are compatible with commonly-used printing apparatuses provides a plurality of setting items, such as selection of paper types, image quality setting, and selection of finishing processing, there are cases in which a plurality of functions is not able to be concurrently used depending on a setting of each function. These are generally called a "conflict condition" ("conflict-based inhibition condition"), and, in a case where a print setting according with the conflict condition is set, the printer driver feeds back to the user information indicating that the set print setting corresponds to a combination of setting items which is not able to be designated.

However, in the case of a cloud print service, since a driver exclusively used for the cloud print service is used, a determination that is based on a conflict condition set for each printing apparatus is not able to be performed, so that the user cannot know whether a print setting set by the user accords with the conflict condition.

SUMMARY

According to embodiments of the present disclosure, a server system, which registers, based on a registration request received from a printing apparatus, information about the printing apparatus and transmits print data received from an information processing apparatus to the registered printing apparatus, includes an acquisition unit configured to acquire, from the information processing apparatus, print settings of print data and information about the printing apparatus, which is set as a transmission destination for print data in the print settings, a determination unit configured to make a determination as to whether the acquired print settings include a print setting which accords with a conflict condition associated with the acquired information, and a transmission unit configured to transmit, to the information processing apparatus, information that is based on a result of the determination.

Further features of the present disclosure will become apparent from the following description of exemplary embodiments with reference to the attached drawings.

BRIEF DESCRIPTION OF THE DRAWINGS

FIG. 4 is a diagram illustrating an example of a sequence for registering a printer with the cloud print service in the present exemplary embodiment.

FIG. 5A is a diagram illustrating an example of an information database about printers which the cloud print service stores in the present exemplary embodiment.

FIG. 5B is a diagram illustrating an example of an information database about printer drivers which the printer driver distribution service stores in the present exemplary embodiment.

FIG. 5C is a diagram illustrating an example of an information database about applications which the printing extension application distribution service stores in the present exemplary embodiment.

FIG. 6 is a diagram illustrating an example of a sequence for installing an printing extension application on the client computer in the present exemplary embodiment.

FIG. 7 is a diagram illustrating an example of an operation panel on which a printable job list received from the cloud print service is displayed in the present exemplary embodiment.

FIG. 9 is a diagram illustrating an example of device capability information in the cloud print service in the present exemplary embodiment.

FIG. 12A is a flowchart illustrating processing which the client computer performs when a printing instruction has been issued in the present exemplary embodiment.

FIG. 13 is a diagram illustrating an example of conflict information in the present exemplary embodiment.

DESCRIPTION OF THE EMBODIMENTS

Figure 1:
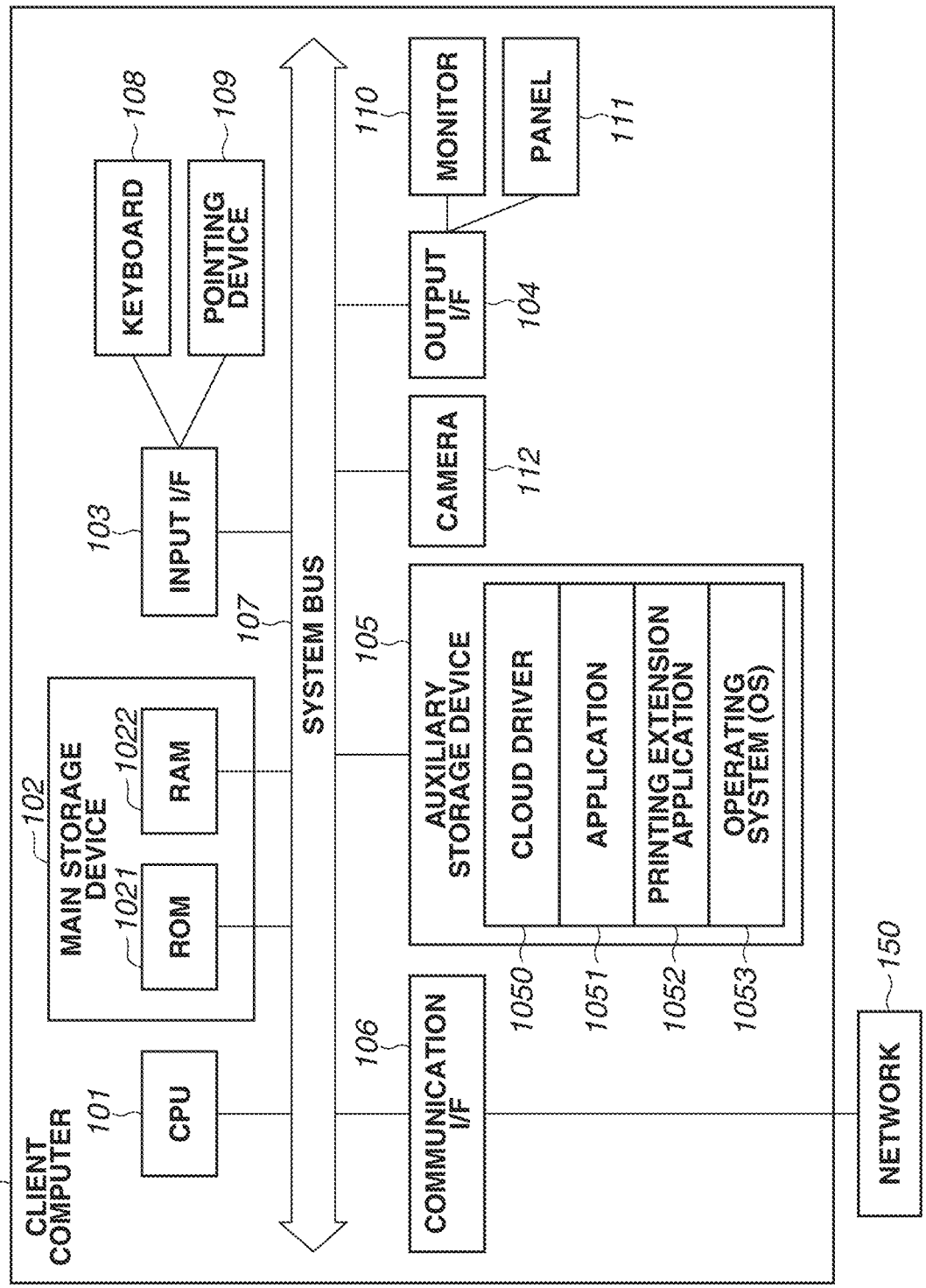
FIG. 1 is a diagram illustrating an example of a hardware configuration of a client computer in an exemplary embodiment of the present disclosure.

FIG. 1 is a hardware configuration diagram of a client computer (information processing apparatus) which uses a cloud print service in an exemplary embodiment of the present disclosure. The detailed description thereof is as follows.

A central processing unit (CPU) 101 performs control of the entire client computer 100 according to a program stored in a read-only memory (ROM) 1021 or a random access memory (RAM) 1022 of a main storage device 102 or an auxiliary storage device 105.

The RAM 1022 is also used for a work area which the CPU 101 uses when performing various processing operations. The auxiliary storage device 105 records thereon, for example, a cloud driver 1050, an operating system (OS) 1053, an application 1051, and a printing extension application 1052. In the following description, the main storage device 102 and the auxiliary storage device 105 are collectively referred to as a "storage device".

Input devices such as a pointing device 109, which is typified by, for example, a mouse or a touch panel, and a keyboard 108 are devices which are connected to a system bus 107 via an input interface (I/F) 103 and are used for the user to issue various instructions to the client computer 100.

An output I/F 104 is an interface which is used to output data to the outside, and outputs data to an output device such as a monitor 110 or a panel (operation panel) 111. Moreover, the client computer 100 has an image capturing function and thus includes a camera 112 mounted thereon.

The client computer 100 is connected to a printer 200, described below with reference to FIG. 2, or each system through a network 150 via a communication I/F 106. Moreover, a common data system bus 107 is used to exchange data between I/Fs and modules.

Figure 2:
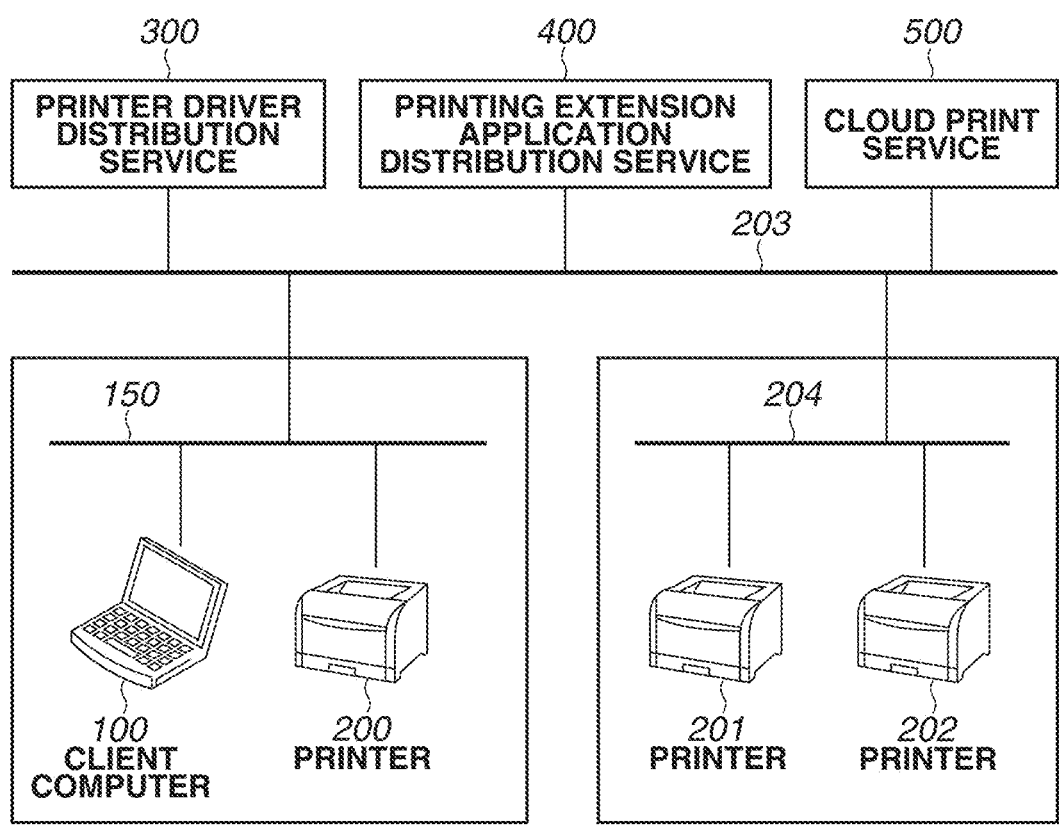
FIG. 2 is a configuration diagram illustrating an example of a printing system configured as a network in the present exemplary embodiment.

FIG. 2 is a schematic view schematically illustrating an environment of networks in the present exemplary embodiment.

The client computer 100 and the printer 200 are connected to the network 150. The client computer 100 and the printer 200 are connected to one and the same intra-network and are able to communicate with each other.

Moreover, a printer 201 and a printer 202 are connected to another intranet 204, and the network 150 is connected to the intranet 204 via the Internet 203. A printer driver distribution service 300, a printing extension application distribution service 400, and a cloud print service 500 are connected to the Internet 203.

The printer driver distribution service 300 is configured with one or a plurality of information processing apparatuses, which performs a service for distributing printer drivers to the client computer 100 on a web base. The client computer 100 searches for the printer 200 with a protocol such as Web Services for Devices (WSD) or Internet Printing Protocol (IPP). The client computer 100 acquires, from the printer driver distribution service 300, a printer driver which is specified based on printer identification information about the found printer 200, and installs the acquired printer driver thereon. The printer driver which is registered with the printer driver distribution service 300 is updated by a printer vendor. The client computer 100 automatically or manually acquires, from the printer driver distribution service 300, a printer driver the version of which is latest, and updates the previously installed printer driver with the acquired printer driver.

The printing extension application distribution service 400 is a server system which performs a service for distributing applications which are to be executed by the client computer 100. The printing extension application is an application which is used to extend a printing function which a cloud print service or an OS provides. The printing function which a cloud print service or an OS provides allows print settings to be performed with respect to only general functions which printers of any vendors are able to use, for example, only color mode and duplex printing. Using the printing extension application makes it possible to use a printing function which is not able to be set by the printing function which a cloud print service or an OS provides, for example, functions for stapleless stapling and poster printing.

When receiving a user operation which requests installation of a printing extension application, the client computer 100 accesses the printing extension application distribution service 400 and installs the printing extension application thereon. Moreover, in a case where an application identifier is described in an INF (information) file of the printer driver installed on the client computer 100, installation of a printing extension application is performed. The client computer 100 accesses the printing extension application distribution service 400 and installs a printing extension application corresponding to the application identifier described in the INF file.

The cloud print service 500 is a service which is built out on a cloud which is a server system composed of one or a plurality of information processing apparatuses. In the present exemplary embodiment, the cloud print service 500 is able to connect to each intranet and is able to connect to the client computer 100, the printer 200, the printer 201, and the printer 202 via the Internet 203. The cloud print service 500 is subjected to account management with use of a user identification (ID) and a password, and the client computer 100 accesses the cloud print service 500 with use of account information which the user has input.

Furthermore, in the present exemplary embodiment, the client computer 100 is assumed to previously store the Uniform Resource Locators (URLs) of the cloud print service 500 and the printing extension application distribution service 400. Moreover, the cloud print service 500 is assumed to previously store the URL of the printer driver distribution service 300.

Figure 3A:
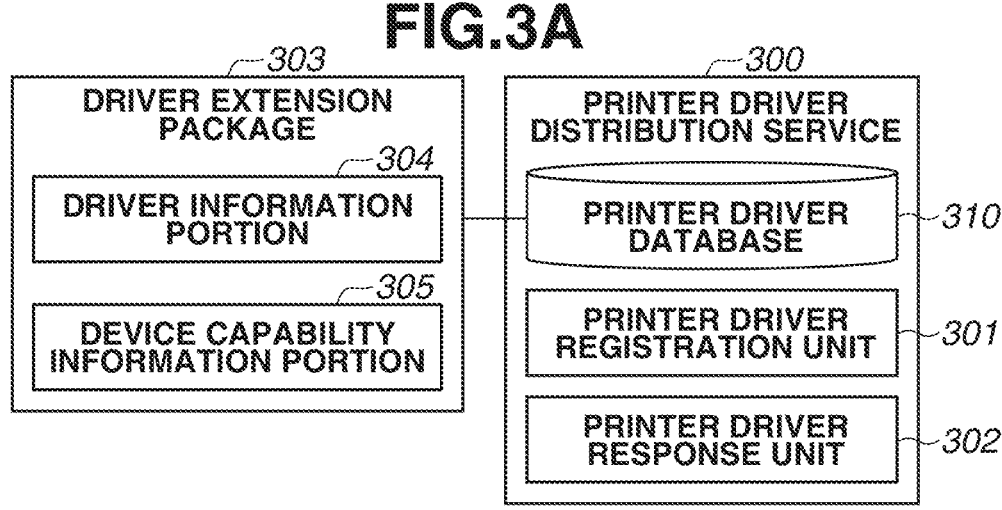
FIG. 3A is a diagram illustrating an example of functional blocks of a printer driver distribution service in the present exemplary embodiment.

FIG. 3A is a diagram illustrating an example of functional blocks of the printer driver distribution service 300. The printer driver distribution service 300 is a server system configured with one or a plurality of information processing apparatuses having a configuration similar to that of the information processing apparatus illustrated in FIG. 1. A printer driver registration unit 301 and a printer driver response unit 302 are implemented by a CPU of the information processing apparatus constituting the printer driver distribution service 300 executing a program.

The printer driver distribution service 300 is a service which is present on a cloud via the Internet 203, and is able to distribute packages concerning printer drivers to an external service or the client computer 100. The packages concerning printer drivers are, for example, printer drivers or driver extension packages.

When an instruction for registration of packages concerning printer drivers has been received from an external service or the client computer 100, the printer driver registration unit 301 registers the uploaded packages with a printer driver database 310. For example, the printer driver registration unit 301 registers a printer driver which is distributed by, for example, a printer vendor or a driver extension package which is used to extend a printer driver with the printer driver database 310.

When a request concerning a package concerning printer drivers has been received from an external service or the client computer 100, the printer driver response unit 302 acquires the associated package from the printer driver database 310, and transmits the acquired package as a response. For example, suppose that a request for a printer driver corresponding to the printer 200 in which a print queue has been generated has been received from the client computer 100. The printer driver response unit 302 reads out the printer driver corresponding to the printer 200 from the printer driver database 310, and transmits the read-out printer driver to the client computer 100. Moreover, the printer driver response unit 302 receives, from the client computer 100, a request for acquisition of a driver extension package which is used to extend a currently-installed printer driver. The printer driver response unit 302 reads out a driver extension package corresponding to the requested printer driver from the printer driver database 310, and transmits the read-out driver extension package to the client computer 100.

The printer driver database 310 stores therein a database which is described below with reference to FIG. 5B. The printer driver database 310 also stores therein, in addition to printer drivers corresponding to various printers, a driver extension package 303.

The driver extension package 303 is an example of a package which is distributed from the printer driver distribution service 300. The driver extension package 303 includes a driver information portion 304 and a device capability information portion 305. The driver information portion 304 contains, for example, a hardware identification (HWID) or a compatible identification (COID), which is used to identify a driver, information indicating that the corresponding package is a driver extension package, and information about, for example, the version of the driver extension package 303. The device capability information portion 305 contains device capability information and conflict information about the associated printer 200.

FIG. 13 is a schematic view illustrating a table showing conflict information which is stored in the device capability information portion 305 of the driver extension package 303. In the illustrated table, one row shows one conflict condition. Furthermore, while, actually, each printer has other various conflict conditions, FIG. 13 illustrates, for ease of explanation, eight conflict conditions as typical examples. Each conflict is uniquely identified by a management number in the column A. The column B indicates the number of conflict items. For example, in a conflict condition of the management number 1, the number of conflict items is set to 2, paper type overhead projector sheet (OHP) in the column F and duplex setting in the column N are set to True (T), and the other functions are set to False (F). This means that a combination of OHP and duplex printing is a conflict condition and is not able to be processed by the printer 200. While each of conflict conditions illustrated in FIG. 13 is a conflict condition set between two setting items, a conflict condition can be set between three or more setting items. The column C indicates the content of an error which is displayed when a print job has been canceled according to the conflict condition. The column D to the column S indicate printing functions of the printing apparatus arranged side by side in units of functions, and represent combinations of conflict items. The columns D to the column F indicate paper types, the column G to the column I indicate paper sizes, the column J to the column M indicate staple, the column N indicates duplex setting, the column O to the column Q indicate resolution settings, the column R indicates copy-forgery-inhibited-pattern print setting, and the column S indicates stamp print setting.

In the present exemplary embodiment, even in a case where conflict information is not provided from the printer 200 to the cloud print service 500, the cloud print service 500 is able to acquire conflict information about the printer 200. Moreover, even if conflict information which is provided from the printer 200 to the cloud print service 500 is a part of conflict information which a driver extension package provides, conflict information which is stored in the cloud print service 500 is able to be extended.

Figure 3B:
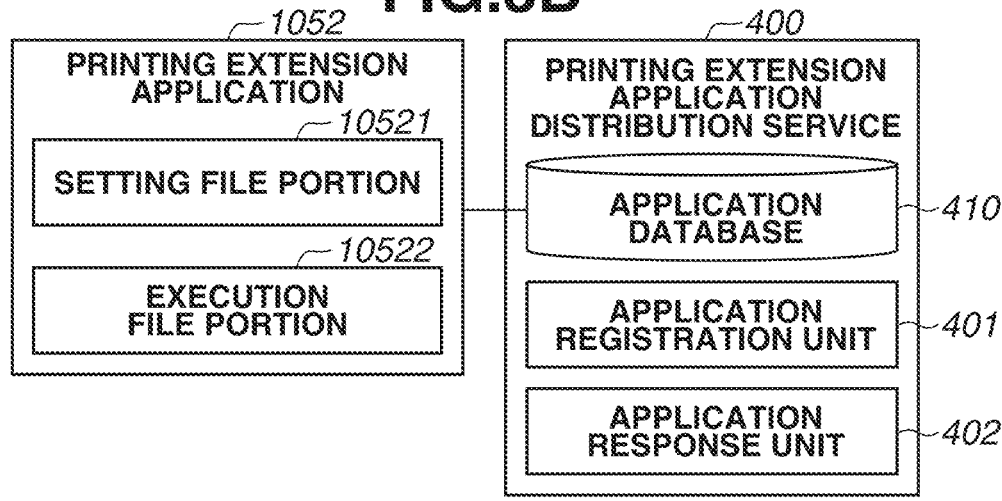
FIG. 3B is a diagram illustrating an example of functional blocks of a printing extension application distribution service in the present exemplary embodiment.

FIG. 3B is a diagram illustrating an example of functional blocks of the printing extension application distribution service 400. An application registration unit 401 and an application response unit 402 are implemented by a CPU of one or a plurality of information processing apparatuses which constitutes the printing extension application distribution service 400.

The printing extension application distribution service 400 is a service present on a cloud via the Internet 203, and is able to distribute a printing extension application to an external service or the client computer 100. Furthermore, the printing extension application distribution service 400 can be configured to be able to distribute not only the printing extension application 1052 but also other applications.

When an instruction for registration of the printing extension application 1052 has been received from an external service or the client computer 100, the application registration unit 401 registers the uploaded application with an application database 410.

When a request for acquisition of the printing extension application 1052 has been received from an external service or the client computer 100, the application response unit 402 acquires the corresponding application from the application database 410 and transmits the acquired application to the requestor.

The application database 410 is a database in which information about a print setting application which, for example, a vendor distributes and a request for registration of which has been received from an external service or the client computer 100 is registered. Details of the information which is registered with the application database 410 are described below with reference to FIG. 5C.

The printing extension application 1052 in the present exemplary embodiment includes a setting file portion 10521 and an execution file portion 10522. The setting file portion 10521 contains an identifier for identifying the printing extension application 1052 and information, such as an HWID or COID, for identifying the associated printer 200. The execution file portion 10522 is an execution file portion used for the printing extension application 1052. The execution file portion 10522 is able to receive a push notification transmitted from a print setting user interface (UI) or an external service and display the received push notification.

Figure 3C:
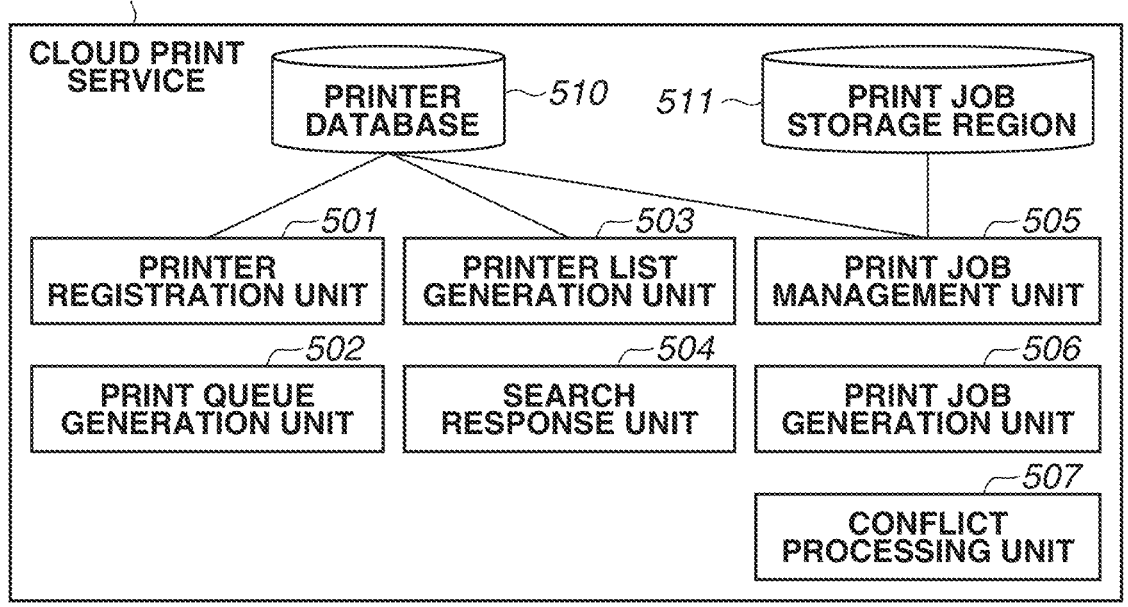
FIG. 3C is a diagram illustrating an example of functional blocks of a cloud print service in the present exemplary embodiment.

FIG. 3C is a functional block diagram of the cloud print service 500 in the present exemplary embodiment. Each functional block is implemented by a CPU of one or a plurality of information processing apparatuses which constitutes the cloud print service 500.

The cloud print service 500 is a service present on a cloud via the Internet 203, and is able to provide functions related to printing. In the present exemplary embodiment, the cloud print service 500 includes functions of a printer registration unit 501, a print queue generation unit 502, a printer list generation unit 503, a search response unit 504, and a printer database 510. Additionally, the cloud print service 500 further includes functions of a print job management unit 505, a print job generation unit 506, and a print job storage region 511. Moreover, these functions can also be included in another cloud print service which cooperates with the cloud print service 500.

While, in the following description, the case of registering the printer 200 with the cloud print service 500 and performing printing with use of the printer 200 is described as an example, such a case can be implemented by similar processing even with respect to the printer 201 or the printer 202, which is able to connect to the cloud print service 500.

When an instruction for registration of the printer 200 has been received from the printer 200, the printer registration unit 501 causes the print queue generation unit 502 to generate a print queue and registers the print queue with the printer database 510 while associating the print queue with printer identification information about the printer 200. Such a state of a print queue for a printer and printer identification information about the printer being registered in association with each other is referred to as "a printer being registered". Here, there is a case where various attributes may be appended to the registered printer. For example, such attributes include the installation location of a printer.

The print queue generation unit 502 generates a print queue on the cloud print service 500 under the control of the printer registration unit 501. When the client computer 100 issues an instruction for printing, a print job is registered in a print queue which the print queue generation unit 502 has generated.

The printer list generation unit 503 generates a list of registered printers. When, for example, a list of printers registered with the cloud print service 500 is requested from the client computer 100, the printer list generation unit 503 generates the list of printers.

In response to a printer search on the cloud print service 500 requested from the client computer 100, the search response unit 504 transmits information about the registered printers to the client computer 100 as a response.

The print job management unit 505 receives image data and print settings from the client computer 100 or transmits a print job which the print job generation unit 506 has generated to the printer 200. Moreover, the print job management unit 505 stores a print job which the print job generation unit 506 has generated in the print job storage region 511.

The printer database 510 is a database which stores information about printers registered with the cloud print service 500. Contents which are stored in the printer database 510 are described below with reference to FIG. 5A.

The conflict processing unit 507 performs conflict processing on print settings acquired from the client computer 100 based on conflict information which the cloud print service 500 has acquired and added from the device capability information portion 305 of the driver extension package 303. In a case where a setting according with a conflict condition is included in the print settings acquired from the client computer 100, the conflict processing unit 507 determines that a conflict is occurring. In a case where a setting according with a conflict condition is not included in the print settings acquired from the client computer 100, the conflict processing unit 507 determines that a conflict is not occurring. Then, the conflict processing unit 507 transmits information indicating whether a conflict is occurring to the client computer 100 as a response.

First, processing for registering the printer 200 with the cloud print service 500 is described.

FIG. 4 is a sequence diagram illustrating processing for registering the printer 200 with the cloud print service 500 in the present exemplary embodiment. In the present exemplary embodiment, the client computer 100 accesses the printer 200 and then operates the printer 200, thus transmitting, to the cloud print service 500, a request for registration of the printer 200.

The printer 200 supports a cloud print function (the function of receiving a print job from the cloud print service 500 and performing printing for the print job) and a web UI function for enabling the client computer 100 to operate the printer 200. The web UI function is a function of generating a UI and publishing the UI on a network. The client computer 100 supports a cloud print client function (the function of transmitting a file to the cloud print service 500) and a web UI client (for example, a web browser) used for operating a web UI. Moreover, the cloud print service 500 represents a cloud print service on the Internet 203.

First, the user uses the web UI client of the client computer 100 to open a web UI of the printer 200, and selects a button used for registering the printer 200 with the cloud print service 500 on the web UI. In response to such a selection being made, in step S410, the client computer 100 transmits a cloud print service registration request to the printer 200.

Upon receiving a request for registration with the cloud print service 500 in step S410, then in step S411, the printer 200 transmits, to the cloud print service 500, a request for registration with the cloud print service 500. In this way, in the present exemplary embodiment, a request for registration of the printer 200 with the cloud print service 500 is transmitted from the web UI client of the client computer 100. The present request can be configured to be transmitted by an input device accompanied by the printer 200, for example, a panel, being operated by the user. At this time, a configuration in which, without the client computer 100 making a request, the printer 200 transmits a request for registration of the printer 200 to the cloud print service 500 can be employed.

The request for registration with the cloud print service 500, which is transmitted to the cloud print service 500 in step S411, is accompanied by information about the printer 200. The information about the printer 200 includes the name of the printer 200, information (HWID) for identifying the model of the printer 200, and a COID for identifying the type of the printer 200, such as an inkjet printer or a laser beam printer. Additionally, the information about the printer 200 further includes Internet Protocol (IP) address information and a capability information file standardized by, for example, the Internet Printing Protocol (IPP). The capability information indicates the maximum capability which the printer 200 has as a function. Thus, even settings described in the capability information may include information about a function which is not able to be executed by the hardware configuration of the printer 200. For example, if a finisher having a stapling function is able to be connected to the printer 200, the capability information includes information indicating that stapling is available, regardless of whether the finisher is currently connected to the printer 200.

Moreover, in step S411, the printer 200 transmits hardware configuration information about the printer 200 to the cloud print service 500. The hardware configuration information is information indicating, for example, whether the printer 200 has a configuration capable of performing stapling or whether the printer 200 has a configuration capable of punching holes.

Upon receiving the registration request in step S411, then in step S412, the cloud print service 500 causes the print queue generation unit 502 to generate a print queue used for transmitting a print job to the printer 200. The print queue generation unit 502 performs generation of a print queue. The print queue is generated with use of the name of the printer (device name), an HWID and a COID for identifying the model and type of the printer, and the IP address of the printer, which are information about the printer 200, from which the registration request has been received. The printer registration unit 501 generates records of the printer, a request for registration of which has been made, and registers information about the printer and capability information about the printer. The printer registration unit 501 can be configured to generate function information indicating functions which the printer 200 is able to execute based on capability information about the printer and the hardware configuration information about the printer and register the generated function information in the print queue.

Next, in step S413, the cloud print service 500 transmits a request for downloading of the driver extension package 303 to the printer driver distribution service 300. This is a request made to receive a driver extension package 303 corresponding to a printer registered with the cloud print service 500. The cloud print service 500 transmits a request for downloading of the driver extension package 303 and the HWID and COID of the printer 200 to the printer driver distribution service 300.

In step S414, the printer driver distribution service 300 transmits the corresponding driver extension package 303 to the cloud print service 500 based on the received HWID and COID. The printer driver distribution service 300 identifies a driver extension package which is a package the extension flag of which is True and accords with the received HWID, from the printer driver database 310. In a case where a driver extension package the extension flag of which is True and which accords with the received HWID is not identified, the printer driver distribution service 300 identifies a driver extension package the extension flag of which is True and which accords with the received COID. Then, the printer driver distribution service 300 transmits the identified driver extension package to the cloud print service 500. Furthermore, in a case where a driver extension package is able to be identified by only an HWID, in step S413, the cloud print service 500 can be configured to transmit only the HWID to the printer driver distribution service 300.

Then, in step S415, the cloud print service 500 analyzes the device capability information portion 305 of the downloaded driver extension package 303 and thus extends the print queue. The cloud print service 500 acquires capability information about the printer 200 from the device capability information portion 305 of the downloaded driver extension package 303. Then, the cloud print service 500 updates capability information about a printer corresponding to a print queue of printer information in the printer database 510. In step S415, the cloud print service 500 rewrites capability information associated with the print queue with capability information acquired from the driver extension package. At this time, the cloud print service 500 can be configured to update the extended capability information and function information about functions which the printer 200 is able to execute with the hardware configuration of the printer 200.

In the present exemplary embodiment, the capability information acquired from the printer 200 is configured to be overwritten with capability information acquired from the driver extension package. The cloud print service 500 can be configured to add, to capability information corresponding to a print queue, capability information concerning a setting item which is not associated with the print queue from among pieces of capability information acquired from the driver extension package.

Moreover, in the present exemplary embodiment, capability information is configured to be transmitted from the printer 200. The printer 200 can be configured to transmit, to the cloud print service 500, information obtained by adding, to capability information about the printer, the hardware configuration connected to the printer. In this case, the cloud print service 500 identifies function information about the printer 200 based on the capability information about the printer 200 acquired from the driver extension package and the capability information acquired from the printer 200. Then, the cloud print service 500 can be configured to update the function information about the print queue on the cloud print service 500 with the identified function information.

With the above-mentioned processing, the print queue is extended with vendor-specific device capability information with respect to the printer 200 registered with the cloud print service 500. Then, in step S416, the cloud print service 500 registers information about the printer 200 with the printer database 510. With the above-mentioned processing, the capability information extended with the driver extension package is registered with the printer database 510 as capability information corresponding to the print queue.

FIG. 5A illustrates an example of a printer database 510 which the cloud print service 500 stores. The column "device name" indicates the name (device name) of a printer acquired from the printer 200 at the time of registration. The column "HWID" indicates an identifier for identifying the model of the printer 200 (a model-specific identifier). The column "COID" indicates identification information for identifying the category of a printer, such as information indicating whether the printer 200 is an inkjet printer or a laser beam printer. The column "IP address" indicates the IP address of the printer 200 serving as a connection destination. The column "package" indicates the package name of a driver extension package 303 used for extension of a print queue corresponding to the printer concerned. Furthermore, in a case where there is no extension applied to the printer concerned, the column "package" shows "null". Additionally, although not illustrated in FIG. 5A, in addition to the illustrated table, for example, capability information about a vendor-specific device extended with the driver extension package 303 is registered as a database in the format of Javascript Object Notation (JSON). The format in which capability information about a device is stored is not limited to JSON, but can be another data format. Moreover, in the table illustrated in FIG. 5A, information about a printer and information about a user who is allowed to use the printer can be configured to be stored while being associated with each other.

FIG. 9 illustrates an example of capability information which is stored while being associated with a print queue. As an example, the capability information is expressed in the format of JSON, and respective settings represent functions. Moreover, each function has options which are settable in a sequence form.

Information 901 represents standard capability information defined by, for example, the IPP. "Duplex" represents a setting item concerning a duplex function, and indicates including, as options for the setting item, "Duplex" representing duplex printing and "One-Sided" representing one-sided printing. "Color" represents a setting item concerning color printing, and indicates including, as options for the setting item, "Mono" representing black-and-white printing and "Color" representing color printing. "Orientation" represents a setting item concerning the orientation of paper for use in printing, and indicates including, as options for the setting item, "Portrait" representing a portrait-oriented direction and "Landscape" representing a landscape-oriented direction. Furthermore, capability information which is provided from the printer 200 to the cloud print service 500 includes standard setting items and options defined by, for example, the IPP. Extending capability information about a device with use of a driver extension package enables even a standard setting item defined by, for example, the IPP, such as that included in the information 901, to have vendor-specific options. For example, with regard to "Staple", which is a setting item concerning binding of paper, in addition to "Staple left top", which indicates one portion binding at the upper left serving as a standard option, "Saddle Stitch", which indicates saddle stitching, becomes able to be set.

Figure 8A:
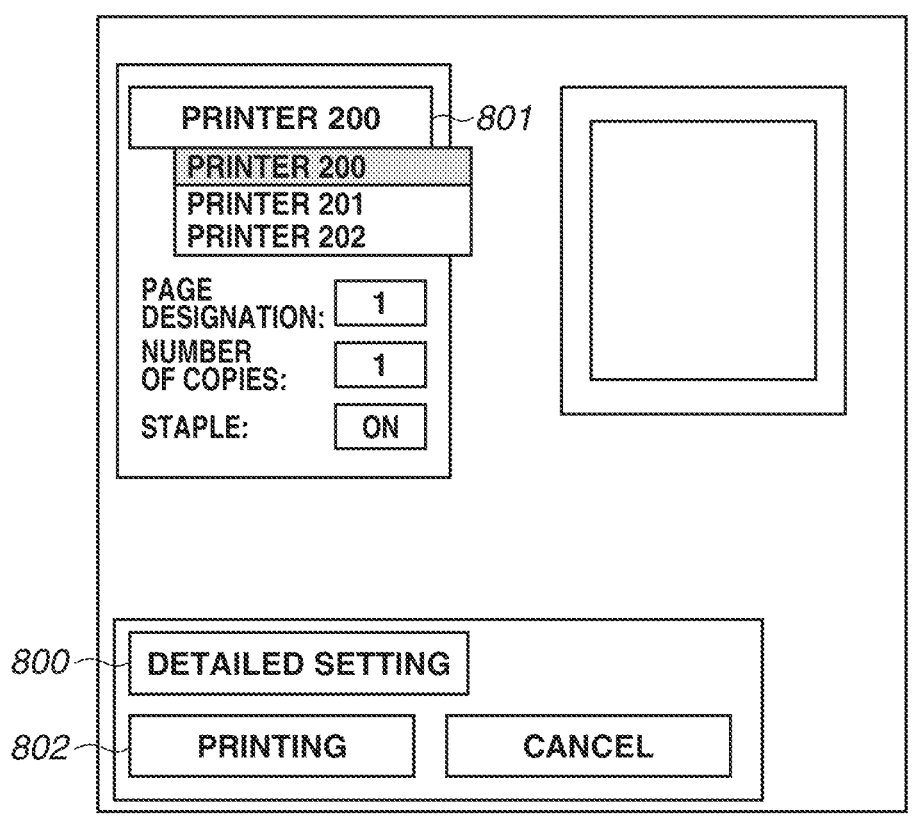
FIG. 8A is a diagram illustrating an example of a printing common dialog which an operating system (OS) displays in the present exemplary embodiment.
Figure 8B:
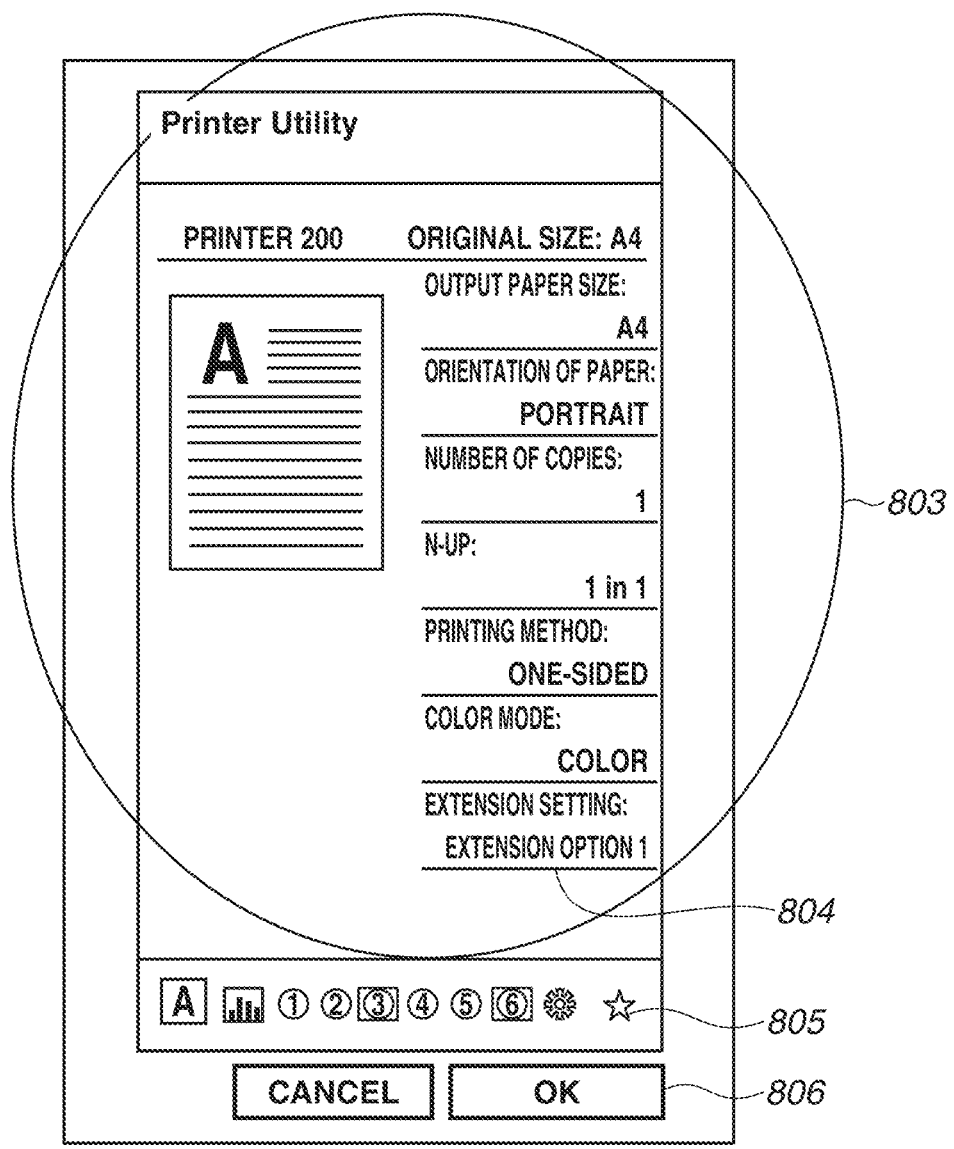
FIG. 8B is a diagram illustrating an example of a print setting screen which the printing extension application displays in the present exemplary embodiment.

The printing extension application 1052 generates a print setting screen illustrated in FIG. 8B based on these pieces of information.

Information 902 represents capability information extended with the driver extension package 303, and is, for example, capability information concerning a vendor-specific setting item. The information 902 includes "Extension_Setting1" and "Extension_Setting2" as functions and "Extension_option1" and "Extension_option2" as options thereof. The functions "Extension_Setting" include, for example, a setting item concerning saddle stitch book binding and a setting item concerning paper mixture in which a plurality of types of paper is mixed in one job. In the case of the paper mixture function, a character string indicating paper mixture is inserted into "Extension_Setting1". Then, for example, a character string indicating that A3 paper and A4 paper are used is inserted into "Extension_option1", and a character string indicating that B4 paper and B5 paper are used is inserted into "Extension_option2". The device capability information portion 305 of the driver extension package 303 can be configured to include an option which is not able to be selected by the standard protocol such as the IPP.

Thus, the extension function can be configured to include one or a plurality of definitions. While, in FIG. 9, an example using the JSON format has been described, another data format can be used.

Upon completion of registration with the printer database 510, then in step S417, the cloud print service 500 transmits, to the printer 200, a cloud print service registration request response and a registration URL presentation request, each of which includes a registration URL for cloud print registration.

Upon receiving the cloud print service registration request response and the registration URL presentation request, then in step S418, the printer 200 outputs registration URL information. In step S418, the printer 200 displays a URL on the monitor 110 or prints out a sheet of paper on which the registration URL information has been described, thus notifying the user of the registration URL. Moreover, the printer 200 can be configured to notify the client computer 100 of the registration URL via a web UI.

In step S419, the user operates the client computer 100 to access the cloud print service 500, which is located at the registration URL presented by the printer 200. At that time, since the user is required to be logged in to a cloud account which allows access to the cloud print service 500, the user needs to input a user ID and a password.

The cloud print service 500 associates the user and the printer 200 with each other based on the cloud account and the registration URL including printer information. The method for such association includes, for example, a method of associating printer information and a user token with each other. However, the method for such association is not limited. Then, in step S420, the cloud print service 500 transmits a user token including information about the cloud print service 500 to the printer 200, thus ending processing for registering the printer 200 with the cloud print service 500. Since then, the printer 200 accesses the cloud print service 500 with use of the received user token.

Here, the printer driver database 310, which the printer driver distribution service 300 stores, is described. FIG. 5B is illustrates an example of the printer driver database 310, which the printer driver distribution service 300 stores. The column "package name" indicates the name of a package acquired from the driver information portion 304 at the time of registration. The column "HWID" indicates identification information (model-specific identification information) which is used to identify the model of the printer 200. The column "COID" indicates identification for identifying the category of a printer which uses the driver concerned. The column "package" indicates the name of a package which contains the driver extension package 303. The package can be information such as file path, as long as it is information capable of identifying a driver or a driver extension package corresponding to the driver concerned. The column "extension" indicates whether the driver extension package 303 is an extension file. When the column "extension" shows "FALSE", the package concerned is not an extension package but a printer driver. On the other hand, when the column "extension" shows "TRUE", the package concerned is not a printer driver but a package for extending a driver. The column "application identifier" is identification information for identifying an application which is used to extend a print setting screen with use of capability information stored in the driver extension package concerned. While, in the present exemplary embodiment, only driver extension packages include an application identifier, printer drivers can also include an application identifier.

When registering a package with the printer driver database 310, the printer driver registration unit 301 analyzes the driver information portion 304. The printer driver registration unit 301 acquires a package name, an HWID, a COID, and information indicating whether the package concerned is a driver extension package, and registers such pieces of information as well as the driver extension package 303 with the printer driver database 310.

Next, the application database 410, which the printing extension application distribution service 400 stores, is described. FIG. 5C illustrates an example of the application database 410, which the printing extension application distribution service 400 stores. The column "application name" indicates the name of an application registered with the application database 410, including the printing extension application 1052. The column "application identifier" indicates information for identifying an application including the printing extension application 1052. The column "application package" indicates a file path in which an application including the printing extension application 1052 is stored. The application package can be, for example, the name of a folder in which the application is stored, as long as it is information capable of identifying a package of the registered printing extension application.

The application registration unit 401 analyzes the setting file portion 10521 and acquires an application name and an application identifier. The application registration unit 401 registers the above-mentioned pieces of information as well as the printing extension application 1052 with the application database 410.

Next, processing which is performed to cause the client computer 100 to generate a print queue for the printer 200 registered with the cloud print service 500 and to install a printing extension application on the client computer 100 is described.

FIG. 6 is a sequence diagram of processing for installing the printing extension application 1052 on the client computer 100 in the present exemplary embodiment.

In the case of performing outputting to the printer 200 with use of cloud printing, the client computer 100 transmits a print job to the cloud print service 500. Therefore, it is necessary to cause the client computer 100 to generate a print queue which is to be transmitted to the cloud print service 500.

In the present exemplary embodiment, the client computer 100 generates a print queue for a printer registered with the cloud print service 500 with use of a printer search function which the operating system 1053 includes as a standard function. Usually, in the case of performing a printer search, printers present on one and the same intranet are targeted. For example, referring to FIG. 2, when performing a printer search, the client computer 100 can find the printer 200, but cannot find the printer 201 and the printer 202, which are present outside the intranet. In the present exemplary embodiment, the client computer 100 is able to access the cloud print service 500. In a case where a printer is previously registered with the cloud print service 500, the client computer 100 is able to find the printer registered with the cloud print service 500 by performing a printer search. In the present exemplary embodiment, besides the above-mentioned printer 200, the printer 201 and the printer 202 are previously registered with the cloud print service 500.

In step S610, the client computer 100 performs a printer search, which is a standard function included in the above-mentioned operating system 1053. In step S610, the client computer 100 searches for, besides printers present on the same intranet as the intranet in which the client computer 100 is present, printers registered with the cloud print service 500. The client computer 100 accesses the cloud print service 500 and transmits, to the cloud print service 500, a request for information about a list of printers registered with the cloud print service 500.

Upon receiving information about the printer search, the search response unit 504 of the cloud print service 500 presents information about available printers to the client computer 100. Therefore, in step S611, the cloud print service 500 generates a printer list including printer information about printers which a user who is logged in from the client computer 100 to the cloud print service 500 is able to use. This printer information includes the name of a printer (device name), an HWID for identifying the model of the printer, and an IP address of the printer as mentioned above. Generation of the printer list including printer information is performed by the printer list generation unit 503 of the cloud print service 500 with use of information stored in the printer database 510.

In step S612, the cloud print service 500 transmits the generated printer list as a response to the client computer 100. At this time, the cloud print service 500 concomitantly transmits, as printer information included in the printer list, information such as an HWID and a COID, which is printer identification information illustrated in FIG. 5A. The client computer 100 causes the monitor 110 to display a selection screen for printers which are able to be used by the user, based on the printer list. The user selects a printer which the user wants to use from the presented printer list.

In step S613, the operating system 1053 of the client computer 100 installs the cloud driver 1050, which is used in the cloud print service 500, and performs generation of a print queue for the selected printer. The client computer 100 acquires information about the printer selected by the user from the cloud print service 500 and generates a print queue with use of the acquired information. The client computer 100 generates a print queue based on the HWID, COID, IP address, and capability information about the printer acquired from the cloud print service 500. Furthermore, in a case where the cloud driver 1050 has previously been installed on the client computer 100, the client computer 100 does not install the cloud driver 1050. The client computer 100 generates a print queue with use of the previously installed cloud driver 1050 and the information about the printer acquired from the cloud print service 500.

Additionally, upon completion of generation of a print queue, in step S614, the operating system 1053 of the client computer 100 transmits, to the printer driver distribution service 300, a request for downloading of the driver extension package 303. The client computer 100 transmits, to the printer driver distribution service 300, an HWID, a COID, and a request for acquisition of a driver extension package. Furthermore, the client computer 100 can be configured to transmit only one of an HWID and a COID to the printer driver distribution service 300.

Upon receiving the request for downloading, in step S615, the printer driver distribution service 300 performs download processing onto the client computer 100. The printer driver distribution service 300 identifies a driver extension package according with the received HWID from among driver extension packages registered with the printer driver database 310, and transmits the identified driver extension package to the client computer 100. In a case where there is no driver extension package according with the received HWID from among the driver extension packages, the printer driver distribution service 300 identifies a driver extension package according with the received COID. Then, the printer driver distribution service 300 transmits the identified driver extension package to the client computer 100.

In step S616, the operating system 1053 of the client computer 100 performs installing of the driver extension package 303, and performs extension of device capability information about the print queue generated based on the above-mentioned cloud driver 1050. The client computer 100 updates device capability information corresponding to the print queue with the device capability information included in the driver extension package 303. Thus, the client computer 100 extends the print queue with a vendor-specific device capability with respect to the printer 200 registered with the cloud print service 500. In a case where device capability information is not still acquired from the cloud print service 500, the client computer 100 extends a print queue by associating device capability information included in the driver extension package 303 with the print queue. In a case where device capability information is previously acquired from the cloud print service 500, the client computer 100 extends a print queue by overwriting device capability information acquired from the cloud print service 500 with device capability information included in the driver extension package 303. Moreover, in a case where device capability information is previously acquired from the cloud print service 500, the client computer 100 can extend a print queue by adding device capability information which is included in the driver extension package 303 but is not included in the device capability information acquired from the cloud print service 500. Additionally, the client computer 100 can register, with a print queue, a function which the printer is able to execute as device capability information based on the above-mentioned device capability information and hardware configuration information about the printer.

Next, in step S617, the client computer 100 transmits, to the printing extension application distribution service 400, a request for downloading. At that time, the operating system 1053 transmits a request for downloading of a printing extension application 1052 associated with the target printer based on identifier information about the printing extension application 1052. In the present exemplary embodiment, in the printing extension application distribution service 400, identifier information about the printing extension application 1052 included in the driver extension package 303 and the printing extension application 1052 are associated with each other one-on-one.

Moreover, in the printing extension application distribution service 400, metadata in which information for associating identifier information about the printing extension application 1052 with an HWID included in printer information is described can be previously stored. In that case, a method of downloading an appropriate printing extension application 1052 with use of the stored metadata is employed.

Upon receiving the request for downloading, in step S618, the printing extension application distribution service 400 performs downloading processing onto the client computer 100. The application response unit 402 identifies, from the application database 410, an application corresponding to the application identifier communicated from the client computer 100. The application response unit 402 transmits the identified printing extension application 1052 to the client computer 100. In step S619, the client computer 100 performs installation of the printing extension application 1052.

After the completion of installation, in the client computer 100, the printing extension application 1052 is associated with the printer 200 one-on-one. Accordingly, in the printer 200, storing model information about the printer 200 and print setting information enables presenting an appropriate print setting UI to the user. Alternatively, the printing extension application 1052 can communicate with the cloud print service 500 to acquire model information about the target printer and print setting information and then present a UI using such pieces of information. Upon completion of installation of the printing extension application 1052, the user becomes able to use changing of detailed print settings.

Furthermore, in the present exemplary embodiment, after the client computer 100 generates a print queue, the client computer 100 accesses the printer driver distribution service 300 to acquire the driver extension package 303. The client computer 100 can be configured to acquire information about the extended print queue from the cloud print service 500 and the client computer 100 can be configured not to perform extension of the print queue. In that case, the client computer 100 omits steps S614 to S616. Moreover, the client computer 100 can be configured to acquire information about the extended print queue from the cloud print service 500 and then perform processing illustrated in steps S614 to S616.

Next, a case where the user operates the client computer 100 to perform printing via the cloud print service 500 is described.

In the case of perform cloud printing, the user issues a printing instruction via the application 1051 included in the client computer 100. As a specific example, the user selects a "printing" button from a file menu of the application 1051. In response to a printing instruction from the user, the application 1051 issues an instruction to the operating system 1053 to display a printing common dialog (a print setting screen which the operating system 1053 provides) illustrated in FIG. 8A. Upon receiving the instruction from the application 1051, the operating system 1053 displays a printing common dialog. The printing common dialog, which the operating system 1053 displays, is configured to display a list of printers for each of which a print queue is currently generated in the client computer 100 and enable designation of a page to be printed, setting of the number of copies, and setting of staple. In a region 801, names of print queues each of which is generated in the client computer 100 are displayed. In the region 801, in addition to a print queue for a printer connected to the client computer 100 via an intranet, print queues for printers each of which is able to be used for printing via the cloud print service 500 are displayed. In the printing common dialog, the user is only able to perform designation of a page and setting of the number of copies, such as those which are to be set when any printer is used.

To perform print settings which the user is not able to set in the printing common dialog, the user selects a print queue for a printer which the user wants to use for outputting in the printing common dialog and then selects a "detailed setting" button (object) 800, which is displayed in the printing common dialog. When the user selects the "detailed setting" button 800, the installed printing extension application 1052 is activated, so that a print setting screen illustrated in FIG. 8B is displayed. In the print setting screen which the printing extension application 1052 provides, it is possible to perform print settings which are not able to be set in the printing common dialog, such as setting of image processing, for example, density or color tone, possibility or impossibility of stamp synthesis, and settings of punching position or stapling position.

Here, the print setting screen which the printing extension application 1052 provides is described with reference to FIG. 8B.

When the user selects the "detailed setting" button 800 in the printing common dialog, the printing extension application 1052 acquires capability information associated with a print queue present on the client computer 100 generated in the cloud print service 500.

The execution file portion 10522 generates a print setting screen illustrated in FIG. 8B based on the acquired capability information. A print setting portion 803 is able to be used to change print settings based on the capability information for the print queue. An extension setting 804 is an operation portion generated based on the capability information extended with the driver extension package 303. A region 805 is used to switch a screen which is being displayed and to change items to be set. An "OK" button 806 is an enter button which is to be used to complete printing using the printing extension application 1052. When the user selects the "OK" button 806, the printing extension application 1052 transmits print settings and a request for conflict processing to the cloud print service 500.

The cloud print service 500 determines whether a setting according with a conflict condition is included in the print settings received from the printing extension application 1052, with use of the conflict processing unit 507. The cloud print service 500 transmits a result of the determination made by the conflict processing unit 507 to the printing extension application 1052. The result of determination which the cloud print service 500 transmits to the client computer 100 includes, in addition to a notification indicating whether a setting according with a conflict condition is included in the print settings, a notification indicating which setting item satisfies the conflict condition.

When receiving a notification indicating that a setting according with a conflict condition is included, the printing extension application 1052 displays a message indicating in which setting item a conflict is occurring. Another method of, for example, providing highlight display or changing display color of an item name can be employed, as long as it is a display method which enables the user to recognize a setting item in which a conflict is occurring. Moreover, in the present exemplary embodiment, the printing extension application 1052 issues a notification indicating a setting item according with a conflict condition. In addition to issuing a notification indicating a setting item according with a conflict condition, the cloud print service 500 can notify the client computer 100 which combination of setting values accords with a conflict condition. Additionally, the cloud print service 500 can notify the client computer 100 which setting item to change to what setting values to resolve a conflict.

When receiving a notification indicating that a setting according with a conflict condition is included, the printing extension application 1052 passes the print settings to the operating system 1053, and then, the operating system 1053 ends the printing extension application 1052. The operating system 1053 displays the printing common dialog according to the print settings received from the printing extension application 1052.

When the user selects a "printing" button 802 in the printing common dialog, image data, print settings set in the printing common dialog, and print settings set by the printing extension application 1052 are transmitted to a print queue. In a case where the print queue set in the region 801 is a print queue for a printer registered with the cloud print service 500, the client computer 100 transmits image data and print settings to the print queue in the cloud print service 500. The cloud print service 500 determines whether the received print settings include a setting according with a conflict condition. In a case where the received print settings include a setting according with a conflict condition, the cloud print service 500 causes the client computer 100 to re-perform print settings.

When the user logs in to the printer 200, the printer 200 transmits, to the cloud print service 500, a request for acquisition of bibliographic information about print jobs registered with the cloud print service 500 as print queues. Here, the bibliographic information to be acquired is information required for UI displaying of the printer 200 including, for example, a file name of image data, color mode, the number of copies to be printed, and the date and time of generation of a print job.

The cloud print service 500 generates a printable job list from bibliographic information about print jobs stored in print queues. Then, the cloud print service 500 transmits the generated printable job list to the printer 200. When receiving the printable job list transmitted from the cloud print service 500, the printer 200 displays the received printable job list on an operation panel thereof. FIG. 7 illustrates an example of an operation panel on which the printable job list received from the cloud print service 500 is displayed. The user selects a desired print job from the operation panel and then presses a "print" button 701 to issue an instruction for execution of printing. The printer 200, when having received the instruction for execution of printing, the printer 200 transmits a request for acquisition of a print job to the cloud print service 500. Furthermore, the request for acquisition includes an ID of a print job, i.e., a print job ID, desired to be acquired. The cloud print service 500 transmits a print job of the designated ID to the printer 200, so that the printer 200 performs printing of the print job.

Figure 11A:
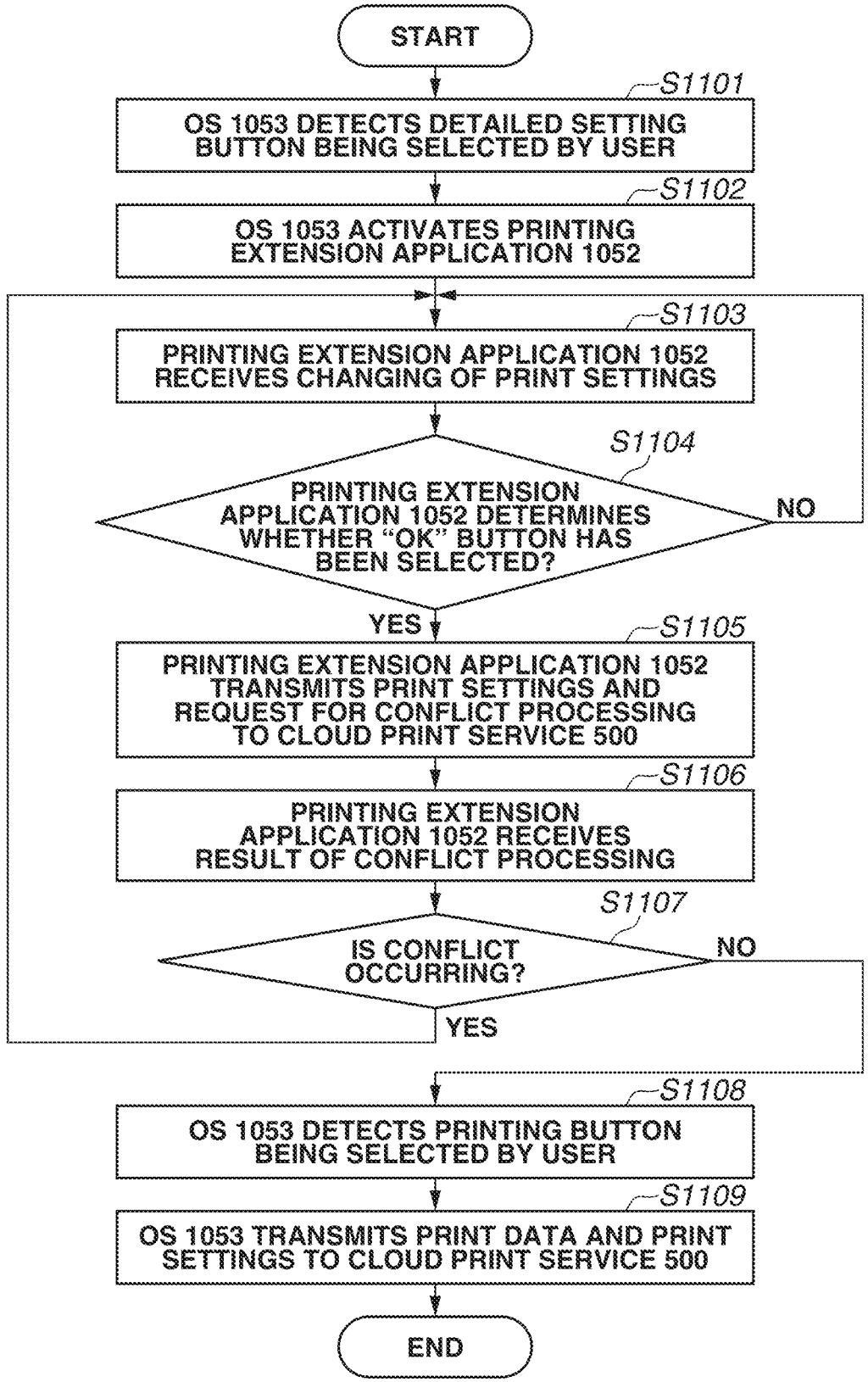
FIG. 11A is a flowchart illustrating processing which the printing extension application performs in the present exemplary embodiment.

Here, processing which the client computer 100 performs starting with performing print settings and ending with performing start of printing is described with reference to FIG. 11A. The processing illustrated in FIG. 11A is implemented by the CPU 101 of the client computer 100 executing a program. The processing illustrated in FIG. 11A is started by the user issuing an instruction for displaying of a print setting screen with an application such as a document creation application or a presentation application and the operating system 1053 displaying the printing common dialog.

In step S1101, the operating system 1053 detects that the user has selected the "detailed setting" button 800, which is displayed in the printing common dialog. When the user has selected the "detailed setting" button (object) 800, which is displayed in the printing common dialog, the operating system 1053 detects that the "detailed setting" button 800 has been selected.

In step S1102, the operating system 1053 activates an installed printing extension application 1052 corresponding to a print queue selected in the printing common dialog, and thus displays the print setting screen illustrated in FIG. 8B. In step S1102, the operating system 1053 notifies the printing extension application 1052 of an HWID associated with the print queue selected in the printing common dialog.

Then, in step S1103, the printing extension application 1052 receives changing of print settings from the user via the print setting screen.

In step S1104, the printing extension application 1052 determines whether the "OK" button 806 has been selected. If it is determined that the "OK" button 806 has not been selected (NO in step S1104), the CPU 101 returns the processing to step S1103, thus receiving print settings.

If, in step S1104, it is determined that the "OK" button 806 has been selected (YES in step S1104), then in step S1105, the printing extension application 1052 transmits print settings and a request for conflict processing to the cloud print service 500. In step S1105, the printing extension application 1052 communicates an HWID communicated from the printing common dialog to the cloud print service 500. The HWID to be communicated here is an HWID about a printer serving as a transmission destination for print data when a conflict is not occurring. In the present exemplary embodiment, the printing extension application 1052 transmits a request for conflict processing to the cloud print service 500 with use of an application programming interface (API).

In step S1106, the printing extension application 1052 receives a result of conflict processing performed in the cloud print service 500. In step S1106, the printing extension application 1052 receives a result of conflict processing as a response to the request for conflict processing transmitted in step S1105. Furthermore, a configuration in which, after the printing extension application 1052 transmits a request for conflict processing to the cloud print service 500 in step S1105, the printing extension application 1052 transmits a request for acquisition of a result of conflict processing to the cloud print service 500 at intervals of a predetermined time can be employed. In that case, in step S1106, the printing extension application 1052 receives a result of conflict processing in the cloud print service 500 as a response to the request for acquisition of a result of conflict processing.

Then, in step S1107, the printing extension application 1052 determines whether a conflict is occurring, based on the received result of conflict processing. If it is determined that a conflict is occurring (YES in step S1107), the printing extension application 1052 displays the name of a setting item in which the conflict is occurring on the monitor 110 of the client computer 100. Then, the printing extension application 1052 returns the processing to step S1103, thus receiving changing of print settings. After changing of print settings, the printing extension application 1052 transmits the print settings and a request for conflict processing to the cloud print service 500 again.

If it is determined, based on a result of conflict processing transmitted from the cloud print service 500, that no conflict is occurring (NO in step S1107), the printing extension application 1052 passes the print settings to the operating system 1053. Then, in step S1108, the operating system 1053 detects selection of the "printing" button 802 in the printing common dialog. Furthermore, the print settings can be changed on the printing common dialog before the "printing" button 802 in the printing common dialog is selected.

In step S1109, the operating system 1053 transmits print data and the print settings to the cloud print service 500. Processing which is performed after the operating system 1053 transmits print data in step S1109 is described below with reference to FIG. 12A.

Figure 11B:
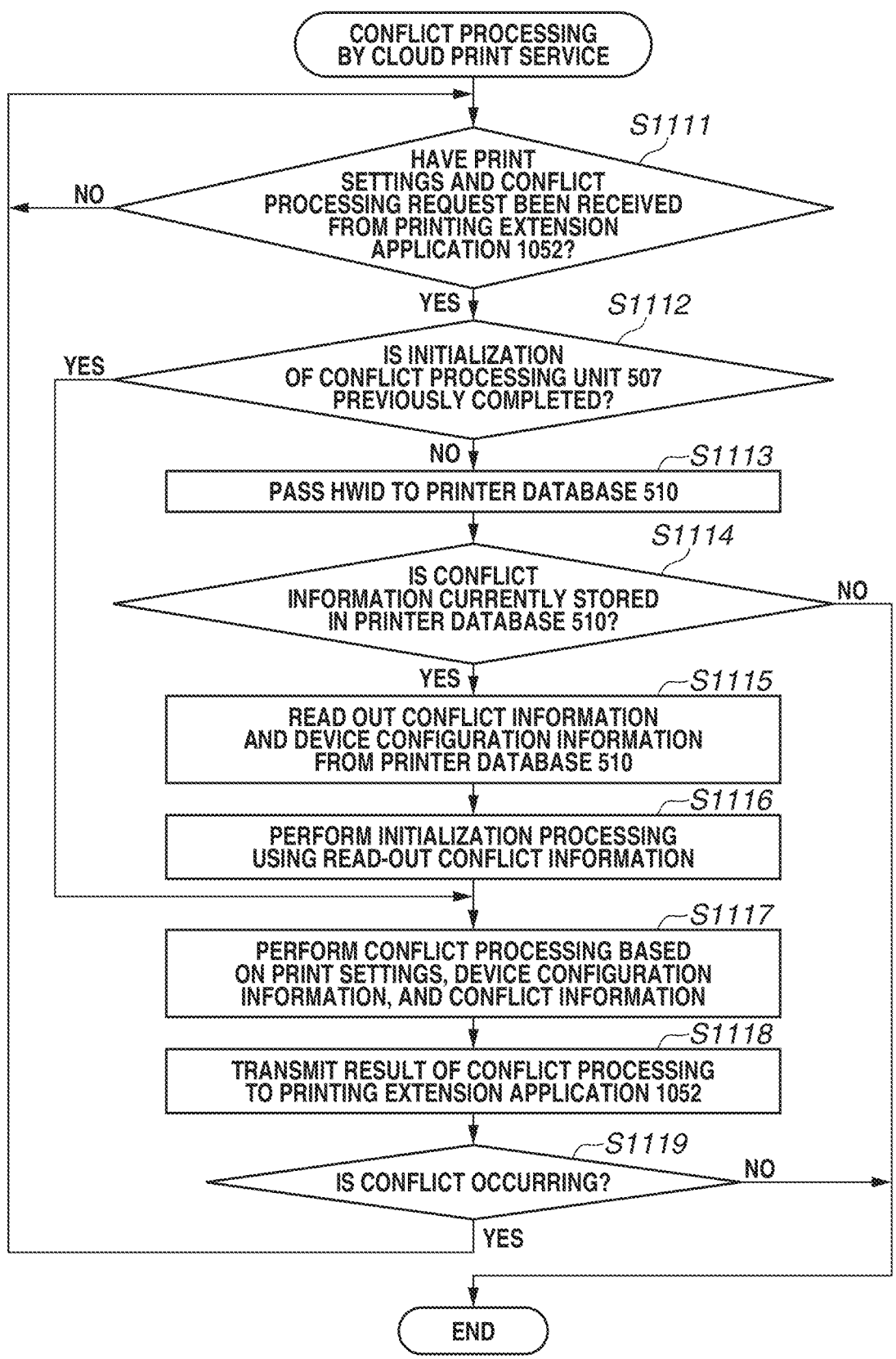
FIG. 11B is a flowchart illustrating conflict processing which the cloud print service performs in the present exemplary embodiment.

On the other hand, processing which the cloud print service 500 performs when receiving a request for conflict processing from the printing extension application 1052 is described with reference to FIG. 11B. FIG. 11B is a flowchart illustrating processing which the cloud print service 500 performs when receiving a request for conflict processing transmitted from the printing extension application 1052 in step S1105 illustrated in FIG. 11A. The processing illustrated in FIG. 11B is implemented by a CPU of one or a plurality of information processing apparatuses which constitutes the cloud print service 500 executing a program.

In step S1111, the conflict processing unit 507 determines whether a request for conflict processing has been received from the printing extension application 1052. If it is determined that no request for conflict processing has been received (NO in step S1111), the conflict processing unit 507 continues to perform processing illustrated in step S1111.

If it is determined that a request for conflict processing has been received (YES in step S1111), then in step S1112, the conflict processing unit 507 determines whether initialization thereof is previously completed. If it is determined that the initialization is previously completed (YES in step S1112), the conflict processing unit 507 advances the processing to step S1117. In FIG. 11B, the initialization of the conflict processing unit 507 refers to processing for performing, on the conflict processing unit 507, setting of conflict information which the conflict processing unit 507 uses. If it is determined that the initialization is not yet completed (NO in step S1112), then in step S1113, the conflict processing unit 507 passes the HWID of a printer acquired from the printing extension application 1052 to the printer database 510. In step S1113, the conflict processing unit 507 passes the HWID, which has been communicated from the printing extension application 1052 in step S1105 illustrated in FIG. 11A, to the printer database 510, and performs acquisition processing for conflict information associated with the communicated HWID. This enables acquiring conflict information corresponding to a printer selected as a transmission destination for print data.

In step S1114, the conflict processing unit 507 determines whether conflict information corresponding to the HWID is currently stored in the printer database 510. The conflict processing unit 507 refers to a printer database such as that illustrated in FIG. 5A to determine whether a driver extension package corresponding to the HWID communicated from the printing extension application 1052, which has transmitted a request for conflict processing, is currently registered in the printer database. If a driver extension package corresponding to the HWID is currently registered, the conflict processing unit 507 determines that conflict information is currently stored. On the other hand, if no driver extension package corresponding to the HWID is currently registered, the conflict processing unit 507 determines that conflict information is not currently stored. Furthermore, besides the above-mentioned method, a method of previously registering flags indicating the presence or absence of conflict information in a printer database and referring to the value of a flag corresponding to an HWID communicated from the printing extension application 1052 to determine whether conflict information is currently stored can be employed. If it is determined that conflict information is not currently stored (NO in step S1114), the conflict processing unit 507 ends the processing.

If it is determined that conflict information is currently stored (YES in step S1114), then in step S1115, the conflict processing unit 507 reads out device configuration information and conflict information about the printer concerned from the printer database 510. The device configuration information is information indicating a device configuration of a printer corresponding to the selected print queue, including, for example, information indicating whether a finisher capable of performing stapling is mounted, whether a finisher capable of performing punching is mounted, and whether a finisher capable of performing stapleless binding is mounted. The device configuration information is information which is acquired from a printer when the printer is registered with the cloud print service 500 and which is updated each time the hardware configuration of the printer is changed.

In step S1116, the conflict processing unit 507 performs initialization processing using the conflict information passed from the printer database 510.

In step S1117, the conflict processing unit 507 performs conflict processing based on the print settings, the device configuration information, and the conflict information. The conflict processing unit 507 refers to the table illustrated in FIG. 13 to determine whether there is an item according with a conflict condition out of setting items and setting values included in the print settings. Moreover, the conflict processing unit 507 determines whether a setting which is not able to be performed by a hardware configuration that is based on the device configuration information is not included in the received print settings. If a setting according with a conflict condition is included and if a setting which is not able to be performed by the printer is included, the conflict processing unit 507 determines that a conflict is occurring. Furthermore, the conflict processing unit 507 can be configured to perform only one of a determination that is based on a conflict condition and a determination that is based on a hardware configuration.

In step S1118, the conflict processing unit 507 transmits a result of conflict processing to the printing extension application 1052. The conflict processing unit 507 transmits a result of conflict processing to the printing extension application 1052 using an API which communicates the result of conflict processing. Furthermore, in a case where a conflict is occurring, the conflict processing unit 507 notifies the printing extension application 1052 of information indicating between which setting item and which setting item a conflict is occurring. Furthermore, in step S1118, the conflict processing unit 507 can notify the printing extension application 1052 of information indicating in which setting value in which setting item a conflict is occurring. Moreover, the conflict processing unit 507 can notify the printing extension application 1052 of information indicating by changing the setting to what setting a conflict is resolved.

In step S1119, the conflict processing unit 507 determines whether a conflict is occurring based on the above-mentioned determination of conflict processing. If it is determined that a conflict is not occurring (NO in step S1119), the conflict processing unit 507 ends the processing illustrated in FIG. 11B. On the other hand, if it is determined that a conflict is occurring (YES in step S1119), since a request for conflict processing may be received from the printing extension application 1052, the conflict processing unit 507 returns the processing to step S1111. In a case where a request for conflict processing has been received from the printing extension application 1052 again, since the conflict processing unit 507 is already initialized with conflict information, the conflict processing unit 507 does not need to perform initialization processing in steps S1113 to S1116. However, to reflect the current device status in conflict processing, the cloud print service 500 can be configured to re-acquire conflict information or device capability information from the printer database 510.

Next, processing which is performed when the user has selected the "printing" button 802 in the printing common dialog is described.

FIG. 12A is a flowchart illustrating processing which is performed when the "printing" button 802 has been selected. The processing illustrated in FIG. 12A is implemented by the CPU 101 of the client computer 100 executing a program.

In step S1201, the operating system 1053 detects that the "printing" button 802 has been selected.

In step S1202, the operating system 1053 transmits print data and print settings to the cloud print service 500. Furthermore, while, in the present exemplary embodiment, in step S1202, the operating system 1053 is configured not to transmit a request for conflict processing to the cloud print service 500, the operating system 1053 can be configured to transmit a request for conflict processing. The print settings to be transmitted in step S1202 include identification information about a printer for use in printing as information indicating a transmission destination for print data. Upon receiving the print data, the cloud print service 500 determines whether a print setting according with a conflict condition is included in the received print settings.

In step S1203, the printing extension application 1052 determines whether a push notification of a result of conflict processing performed by the cloud print service 500 has been received. The push notification of a result of conflict processing is a notification which is transmitted from the cloud print service 500 when a conflict has occurred in the print settings transmitted to the cloud print service 500 in step S1202. If it is determined that the push notification has not been received (NO in step S1203), the client computer 100 ends the processing illustrated in FIG. 12A.

Figure 8C:
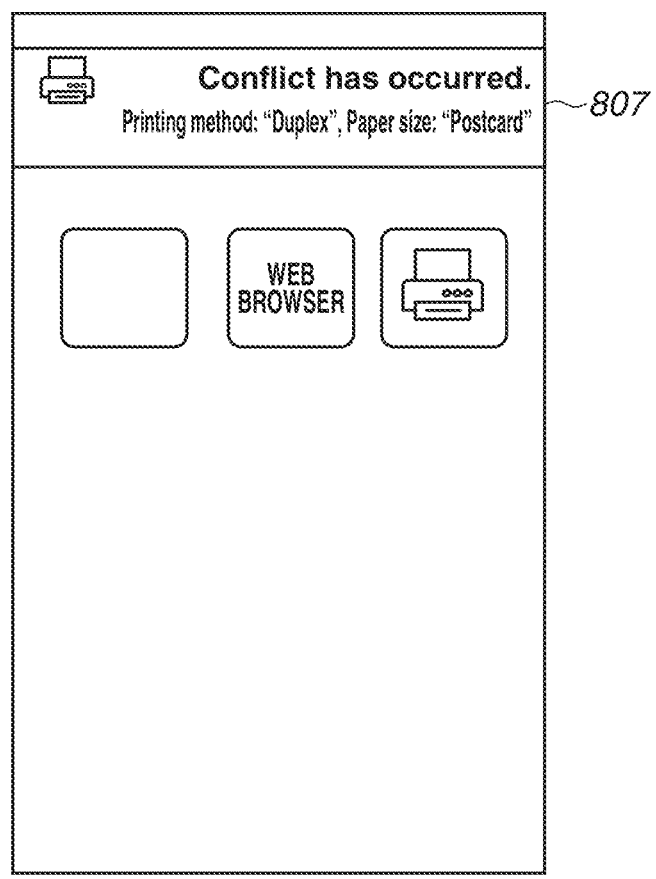
FIG. 8C is a diagram illustrating an example of a push notification which the printing extension application displays in the present exemplary embodiment.

If, in step S1203, it is determined that the printing extension application 1052 has received the push notification (YES in step S1203), then in step S1204, the printing extension application 1052 displays a notification such as a push notification 807 illustrated in FIG. 8C on the monitor 110 of the client computer 100. FIG. 8C illustrates a desktop screen or home screen of the client computer 100. Instead of the above-mentioned screen, the printing extension application 1052 can be configured to display the above-mentioned push notification in a region used to display the status of the client computer 100 or in a pop-up window. In a case where the user has selected the notification 807, the printing extension application 1052 performs processing in step S1205 and subsequent steps. In a case where the user has not selected the notification 807, the client computer 100 ends the processing illustrated in FIG. 12A. Furthermore, in FIG. 8C, the name of a setting item according with a conflict condition is displayed. Besides the setting item, the current setting items or setting items recommended to resolve a conflict can be configured to be displayed.

In step S1205, the printing extension application 1052 determines whether the user has selected the notification 807 and has instructed the printing extension application 1052 to activate a main program thereof.

In step S1206, the printing extension application 1052 notifies the operating system 1053 that the notification 807 has been selected, and the operating system 1053 activates the main program of the printing extension application 1052. In response to step S1206 being performed, the print setting screen illustrated in FIG. 8B is displayed. Furthermore, the notification 807 contains print settings which are currently set, and the printing extension application 1052 displays a print setting screen in which the print settings communicated from the cloud print service 500 have been reflected. At this time, the printing extension application 1052 can be configured to perform displaying in such a way as to show an item in which a conflict is occurring, for example, in such a way as to make the display color of the item in which a conflict is occurring different from that of the other items.

In step S1207, the printing extension application 1052 receives changing of the print settings from the user.

In step S1208, the printing extension application 1052 determines whether the "OK" button 806 has been selected. Until the "OK" button 806 is selected, the printing extension application 1052 returns the processing to step S1207. If it is determined that the "OK" button 806 has been selected (YES in step S1208), the printing extension application 1052 advances the processing to step S1209.

In step S1209, the printing extension application 1052 transmits the print settings and a request for conflict processing to the cloud print service 500. At this time, the printing extension application 1052 can be configured to communicate the HWID of the selected print queue. Moreover, in the configuration of the present exemplary embodiment, when the user has selected the "OK" button 806, the printing extension application 1052 transmits a request for conflict processing to the cloud print service 500. The printing extension application 1052 can be configured to transmit a request for conflict processing to the cloud print service 500 each time the user changes the print settings in the printing extension application 1052.

The printing extension application 1052 receives a result of conflict processing from the cloud print service 500. In step S1210, the printing extension application 1052 determines whether a result of conflict processing indicating that no conflict is occurring has been received. If it is determined that a conflict is occurring (NO in step S1210), the printing extension application 1052 returns the processing to step S1207.

If it is determined that no conflict is occurring (YES in step S1210), then in step S1211, the printing extension application 1052 transmits the print settings and a job ID to the cloud print service 500. Then, the operating system 1053 ends the printing extension application 1052. Furthermore, at this time, even if the "OK" button 806 has been selected in the print setting screen for the printing extension application 1052, the printing common dialog is not displayed. With the above-described processing, a conflict occurring in a print job instructed to be executed for printing is resolved.

Figure 12B:
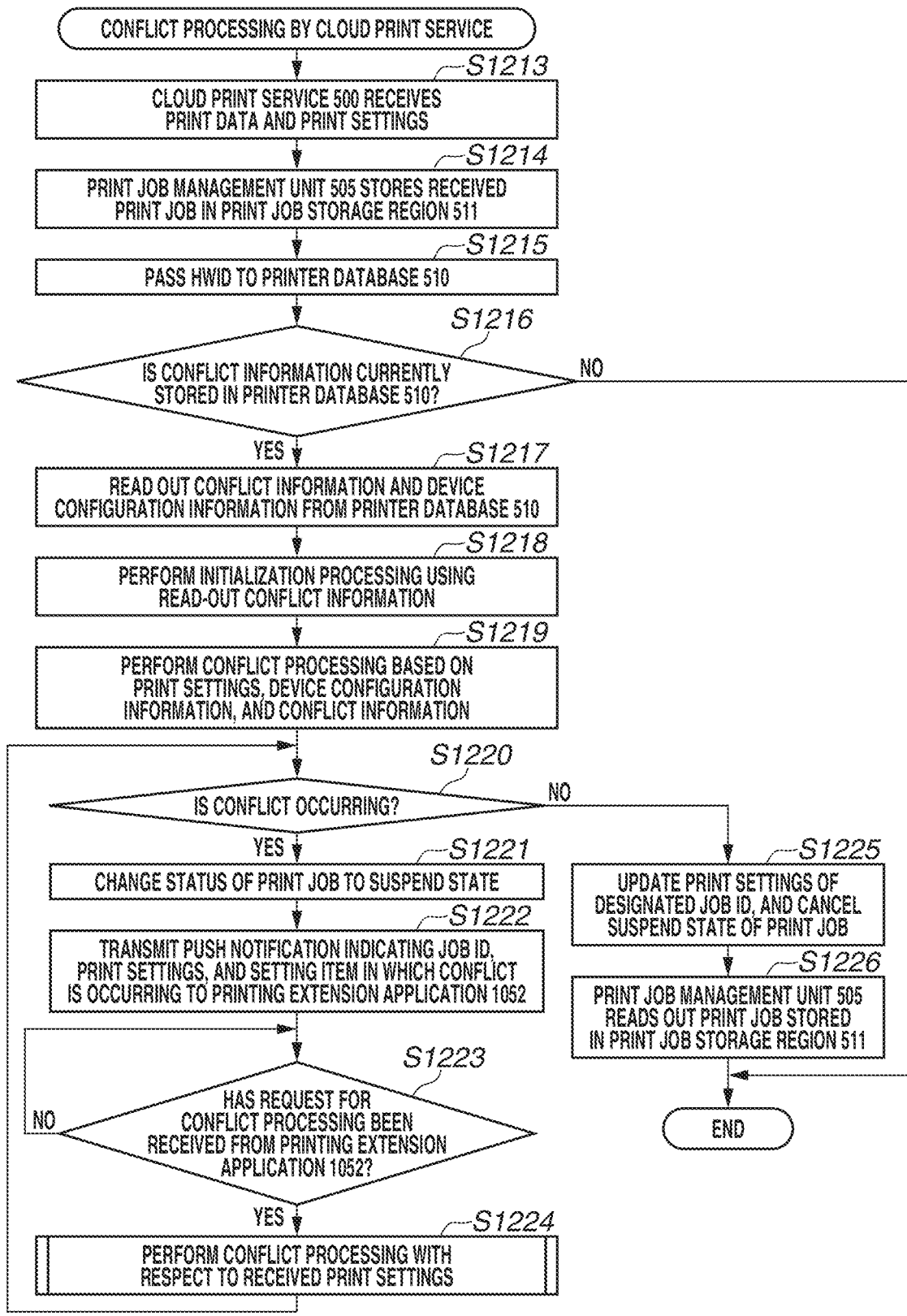
FIG. 12B is a flowchart illustrating conflict processing which the cloud print service performs when a printing instruction has been issued in the present exemplary embodiment.

FIG. 12B is a flowchart illustrating conflict processing which the cloud print service 500 performs when having received print data and print settings from the client computer 100. The processing illustrated in FIG. 12B is implemented by a CPU of one or a plurality of information processing apparatuses which constitutes the cloud print service 500 executing a program.

In step S1213, the cloud print service 500 receives print data and print settings transmitted from the client computer 100. Furthermore, in step S1213, the cloud print service 500 also acquires information indicating to which print queue a print job is addressed from the client computer 100.

In step S1214, the print job management unit 505 of the cloud print service 500 stores the received print job in the print job storage region 511.

Next, in step S1215, the conflict processing unit 507 passes, to the printer database 510, the HWID of the printer acquired from the operating system 1053 of the client computer 100.

In step S1216, the conflict processing unit 507 determines whether conflict information corresponding to the HWID is currently stored in the printer database 510. If it is determined that conflict information corresponding to the designated print queue is not currently stored in the printer database 510 (NO in step S1216), the conflict processing unit 507 ends the processing illustrated in FIG. 12B.

If it is determined that the conflict information is currently stored (YES in step S1216), then in step S1217, the conflict processing unit 507 reads out device configuration information and conflict information about the printer concerned from the printer database 510.

In step S1218, the conflict processing unit 507 performs initialization processing using the conflict information passed from the printer database 510.

In step S1219, the conflict processing unit 507 performs conflict processing based on the print settings, device capability information, and conflict information. The conflict processing unit 507 determines whether the received print settings include a setting according with a conflict condition included in the conflict information. Additionally, the conflict processing unit 507 determines whether a setting which is not able to be performed by a hardware configuration that is based on the device configuration information is not included in the received print settings. If a setting according with a conflict condition is included and if a setting which is not able to be performed by the printer is included, the conflict processing unit 507 determines that a conflict is occurring. Furthermore, the conflict processing unit 507 can be configured to perform only one of a determination that is based on a conflict condition and a determination that is based on a hardware configuration.

In step S1220, the conflict processing unit 507 determines whether a conflict is occurring. If it is determined that a conflict is occurring (YES in step S1220), then in step S1221, the conflict processing unit 507 changes the status of the print job stored in the print job storage region 511 to a suspend state. In the present exemplary embodiment, in the cloud print service 500, the suspend state of the print job refers to a state of temporarily halting processing for transmitting a print job received from the client computer 100 to the printer 200. Even if a request for acquisition of a print job list has been received from the printer 200, the cloud print service 500 does not reflect a job which is being suspended in the print job list. Accordingly, the job which is being suspended is not transmitted to the printer 200. Then, in step S1222, the conflict processing unit 507 transmits a push notification indicating information about the job ID (identification information about the job) of the suspended job, the print settings, and a setting item in which a conflict is occurring to the printing extension application 1052. After transmitting the push notification, then in step S1223, the conflict processing unit 507 determines whether print settings obtained by re-setting, a request for conflict processing, and a job ID have been received from the printing extension application 1052. Until a request for conflict processing is received from the printing extension application 1052, the conflict processing unit 507 performs processing in step S1223.

Upon receiving the print settings, the job ID, and the request for conflict processing from the printing extension application 1052, then in step S1224, the conflict processing unit 507 performs conflict processing for determining whether a conflict is occurring with respect to the received print settings. The processing to be performed in step S1224 is processing similar to the processing illustrated in FIG. 11B and is, therefore, omitted from description.

If it is determined that no conflict is occurring (NO in step S1220), then in step S1225, the conflict processing unit 507 updates the print settings of a print job of the job ID communicated from the printing extension application 1052, which is stored in the print job storage region 511, with the print settings communicated from the printing extension application 1052, and then, the conflict processing unit 507 cancels the suspend state of the print job of the job ID communicated from the printing extension application 1052. Then, in step S1226, the print job management unit 505 reads out the print job the suspend state of which has been canceled from the print job storage region 511, thus performing printing. In response to the suspend state being canceled, processing for transmitting print data received from the client computer 100 to the printer 200 is performed.

Furthermore, in the present exemplary embodiment, conflict processing is configured to be performed at a timing when the print setting screen in the printing extension application 1052 returns to the printing common dialog and at a timing when, in response to an instruction for printing from the user, print data is transmitted to the cloud print service 500. Conflict determination processing can be configured to be performed at any one of the above-mentioned two timings.

Moreover, in FIG. 11A and FIG. 12A, when the "OK" button 806 has been selected in the printing extension application 1052, the conflict processing unit 507 of the cloud print service 500 is configured to perform conflict determination. Each time print settings are changed in the printing extension application 1052, the conflict processing unit 507 can be configured to perform conflict processing to determine whether a conflict is occurring.

In the configuration of the present exemplary embodiment, the client computer 100 does not perform conflict determination and the cloud print service 500 performs conflict determination processing. The client computer 100 can be configured to acquire conflict information from the cloud print service 500 or the printer driver distribution service 300 and the client computer 100 can be configured to perform conflict processing. Moreover, the client computer 100 can be configured to perform a part of conflict processing and the cloud print service 500 can be configured to perform the other conflict determination. For example, the client computer 100 performs only conflict determination between two setting items and the cloud print service 500 performs conflict determination between three or more setting items.

Moreover, in the configuration of the present exemplary embodiment, in a case where a print setting according with a conflict condition is included in the print settings set in the client computer 100, changing of the print settings is performed in the client computer 100. In a case where there is a print setting according with a conflict condition, the cloud print service 500 can be configured to change the setting value of at least one of setting items according with the conflict condition to a setting value according to which a conflict is resolved. For example, in step S1118 illustrated in FIG. 11B, the cloud print service 500 can be configured to transmit an instruction to change the setting value of at least one of setting items according with the conflict condition to a setting value according to which a conflict is resolved. Moreover, in step S1222 illustrated in FIG. 12B, the cloud print service 500 can be configured to transmit a notification for notifying the user that the setting value of at least one of setting items according with the conflict condition has been changed to a setting value according to which a conflict is resolved.

Finally, processing which the cloud print service 500 performs when printing is performed with use of the cloud print service 500 is described with reference to FIG. 10.

Figure 10:
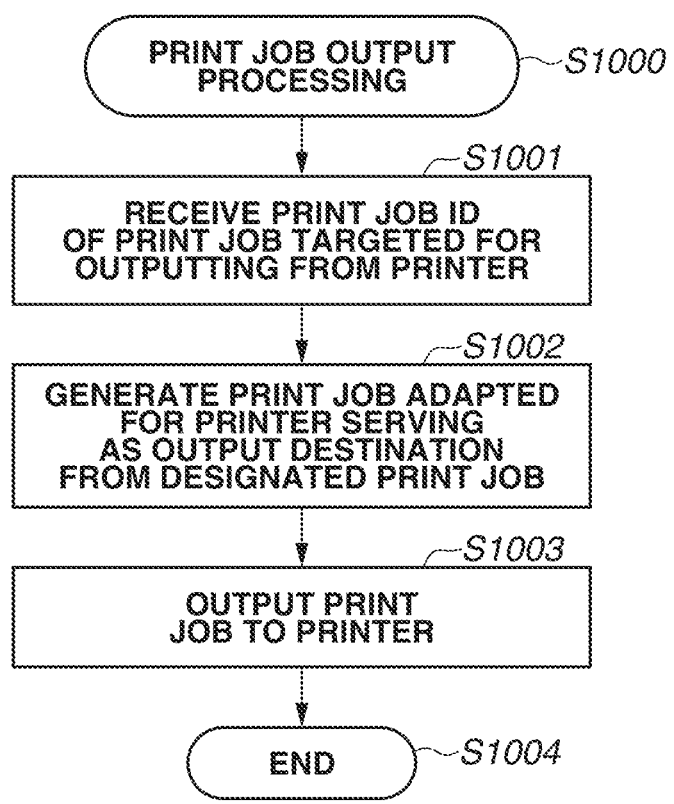
FIG. 10 is a flowchart illustrating print processing in the present exemplary embodiment.

FIG. 10 is a flowchart illustrating processing which the cloud print service 500 performs when the cloud print service 500 has received a request for acquisition of a print job from the printer 200 in the present exemplary embodiment. Unless specifically described otherwise, the present processing is performed by various processing units of the cloud print service 500. First, in step S1001, the print job management unit 505 receives a request for acquisition of a print job from the printer 200 (including a print job ID of a print job targeted for outputting).

Upon receiving the request, the print job management unit 505 identifies the designated print job from the print job storage region 511. In step S1002, the print job management unit 505 passes the identified print job to the print job generation unit 506, and causes the print job generation unit 506 to generate a print job adapted for the printer 200 serving as an output destination.

In step S1003, the print job management unit 505 acquires the generated print job from the print job generation unit 506, and transmits the acquired print job to the printer 200 serving as a print request source.

In the present exemplary embodiment, the user operates the printer 200 to select a print job, and the printer 200 acquires the selected print job from the cloud print service 500. The printer 200 can be configured to periodically access the cloud print service 500 and acquire a print job, which is managed in association with a print queue of the printer 200, from the cloud print service 500.

With the above-described processing, a print job registered with the cloud print service 500 is executed.

Embodiments of the present disclosure can also be implemented by performing the following processing. Specifically, the processing includes supplying software (program) for implementing functions of the above-described exemplary embodiment to a system or apparatus via a network or various types of storage media and causing a computer (or a CPU or micro processing unit (MPU)) of the system or apparatus to read out and execute program code. In the case of this processing, embodiments of the present disclosure include the computer program and a storage medium storing the computer program.

According to exemplary embodiments of the present disclosure, even when a print setting set by the user accords with a conflict condition, printing is enabled to be performed with the conflict condition resolved.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-015843, filed Jan. 31, 2020, which is hereby incorporated by reference herein in its entirety.

What is claimed is:

1. A server system, which transmits print data received from an information processing apparatus to a printer, the server system comprising:
   a memory; and
   a controller configured to:
      cause the memory to store a printer identifier of the printer that is received from the printer, wherein the printer identifier is to be transmitted to the information processing apparatus;
      obtain a combination of print setting values that is specified based on the stored printer identifier, wherein the print setting values designated by the combination conflict with each other;
      store the obtained combination of print setting values in the memory in association with the stored printer identifier;
      determine whether print setting values that are received from the information processing apparatus as print setting values corresponding to print data include the print setting values designated by the combination that is stored in association with the printer identifier of the printer that is designated as a destination of the print data; and
      notify, based on the determination result, the information processing apparatus that the received print setting values include the print setting values designated by the combination.

2. The server system according to claim 1, wherein the combination of the print setting values stored in the memory is obtained from an external apparatus that is different from the printer.

3. The server system according to claim 2, wherein the controller is further configured to:
   obtain capability information of the printer from the printer, wherein the capability information is to be transmitted to the information processing apparatus to display an object relating to print.

4. The server system according to claim 2, wherein the combination of the print setting values is stored in the external apparatus in association with the printer identifier.

5. The server system according to claim 2, wherein the controller is further configured to:
   receive the printer identifier from the information processing apparatus, wherein the printer identifier received from the information processing apparatus corresponds to the printer set as the destination of the print data.

6. The server system according to claim 5, wherein the determination is executed based on the obtained combination of print setting values corresponding to the received printer identifier.

7. The server system according to claim 2, wherein the print setting values specified by the combination are not able to be applied to the print data concurrently.

8. The server system according to claim 1, wherein the controller is further configured to:
   notify the information processing apparatus of the print setting values designated by the combination, in a case that the print setting values received from the information processing apparatus include the print setting values designated by the combination.

9. The server system according to claim 1, wherein the printer identifier indicates a model of the printer.

10. The server system according to claim 1, wherein the controller is further configured to:
    transmit, to the printer, image data that is received from the information processing apparatus and the print setting values that are received from the information processing apparatus and do not include at least one of the print setting values designated by the combination.

11. A control method for a server system, which transmits print data received from an information processing apparatus to a printer, the control method comprising:
    causing a memory to store a printer identifier of the printer that is received from the printer, wherein the printer identifier is to be transmitted to the information processing apparatus;
    obtaining a combination of print setting values that is specified based on the stored printer identifier, wherein the print setting values designated by the combination conflict with each other;
    storing the obtained combination of print setting values in the memory in association with the stored printer identifier;
    determining whether print setting values that are received from the information processing apparatus as print setting values corresponding to print data include the print setting values designated by the combination that is stored in association with the printer identifier of the printer that is designated as a destination of the print data; and
    notifying, based on the determination result, the information processing apparatus that the received print setting values include the print setting values designated by the combination.

12. A non-transitory computer-readable storage medium storing computer-executable instructions that, when executed by a computer, cause the computer to perform a control method for a server system, which transmits print data received from an information processing apparatus to a printer, the control method comprising:
    causing a memory to store a printer identifier of the printer that is received from the printer, wherein the printer identifier is to be transmitted to the information processing apparatus;
    obtaining a combination of print setting values that is specified based on the stored printer identifier, wherein the print setting values designated by the combination conflict with each other;
    storing the obtained combination of print setting values in the memory in association with the stored printer identifier;
    determining whether print setting values that are received from the information processing apparatus as print setting values corresponding to print data include the print setting values designated by the combination that is stored in association with the printer identifier of the printer that is designated as a destination of the print data; and
    notifying, based on the determination result, the information processing apparatus that the received print setting values include the print setting values designated by the combination.

* * * * *